US007680712B2

(12) United States Patent
Thomson et al.

(10) Patent No.: US 7,680,712 B2
(45) Date of Patent: Mar. 16, 2010

(54) ELECTRONIC PROCESSING SYSTEM

(75) Inventors: Scott Thomson, Bollington (GB);
Andrew David Bailey, Paulerspury (GB)

(73) Assignee: Smart Voucher PLC, Bollington, Chesire (GB)

( * ) Notice: Subject to any disclaimer, the term of this patent is extended or adjusted under 35 U.S.C. 154(b) by 947 days.

(21) Appl. No.: 11/138,683

(22) Filed: May 27, 2005

(65) Prior Publication Data

US 2005/0278188 A1 Dec. 15, 2005

Related U.S. Application Data

(63) Continuation-in-part of application No. PCT/GB03/05234, filed on Dec. 1, 2003.

(30) Foreign Application Priority Data

Nov. 29, 2002 (GB) .................................. 0227958.6

(51) Int. Cl.
G06Q 40/00 (2006.01)
(52) U.S. Cl. .......................................... 705/35; 705/30
(58) Field of Classification Search ................ 705/1, 705/30, 35, 36 R, 38; 370/458, 328; 235/380
See application file for complete search history.

(56) References Cited

U.S. PATENT DOCUMENTS

| 3,576,539 A * | 4/1971 | Huber et al. ................. 235/380 |
| 3,582,555 A * | 6/1971 | Kok ............................ 379/40 |
| 3,651,458 A * | 3/1972 | Reynolds et al. ............ 714/807 |
| 3,748,379 A * | 7/1973 | Epstein et al. .............. 382/245 |
| 5,453,601 A | 9/1995 | Rosen |
| 5,901,229 A | 5/1999 | Fujisaki et al. |
| 6,446,052 B1 | 9/2002 | Juels |
| 6,470,010 B1 * | 10/2002 | Szviatovszki et al. ....... 370/356 |
| 2001/0032878 A1 | 10/2001 | Tsiounis et al. |
| 2002/0046082 A1 | 4/2002 | White |
| 2003/0158782 A1 * | 8/2003 | Thomson et al. .............. 705/17 |

FOREIGN PATENT DOCUMENTS

| DE | 100 34 597 A1 | 1/2002 |
| WO | WO 99/05655 | 2/1999 |
| WO | WO 01/67407 A1 | 3/2001 |
| WO | WO 01/54028 A1 | 7/2001 |
| WO | WO 01/88863 A2 | 11/2001 |

OTHER PUBLICATIONS

Carvalho, Stanley "Meet highlights the need to regulate, but not ban, hawala" May 23, 2002 Gulf News.*
Broster, Paul "Terror . . . made in London" Sep. 20, 2002 Express.*
Anonymous "Details of new Ukrainian money-laundering law" Nov. 28, 2002 BBC Monitoring International Reports.*

* cited by examiner

*Primary Examiner*—Kelly Campen
(74) *Attorney, Agent, or Firm*—Finnegan, Henderson, Farabow, Garrett & Dunner LLP

(57) ABSTRACT

A system for use in processing cash transactions comprising an electronic processor and a database, the processor comprising an interface for receiving requests for generating coded numbers representing cash and receiving requests that numbers previously allocated may be redeemed, the interface including a message format storage area storing a plurality of prescribed message formats and determining by reference to the stored message formats the format of a received message, a holding memory for holding requests of specified message formats so that single requests for generating a plurality of numbers in a batch can be processed.

13 Claims, 18 Drawing Sheets

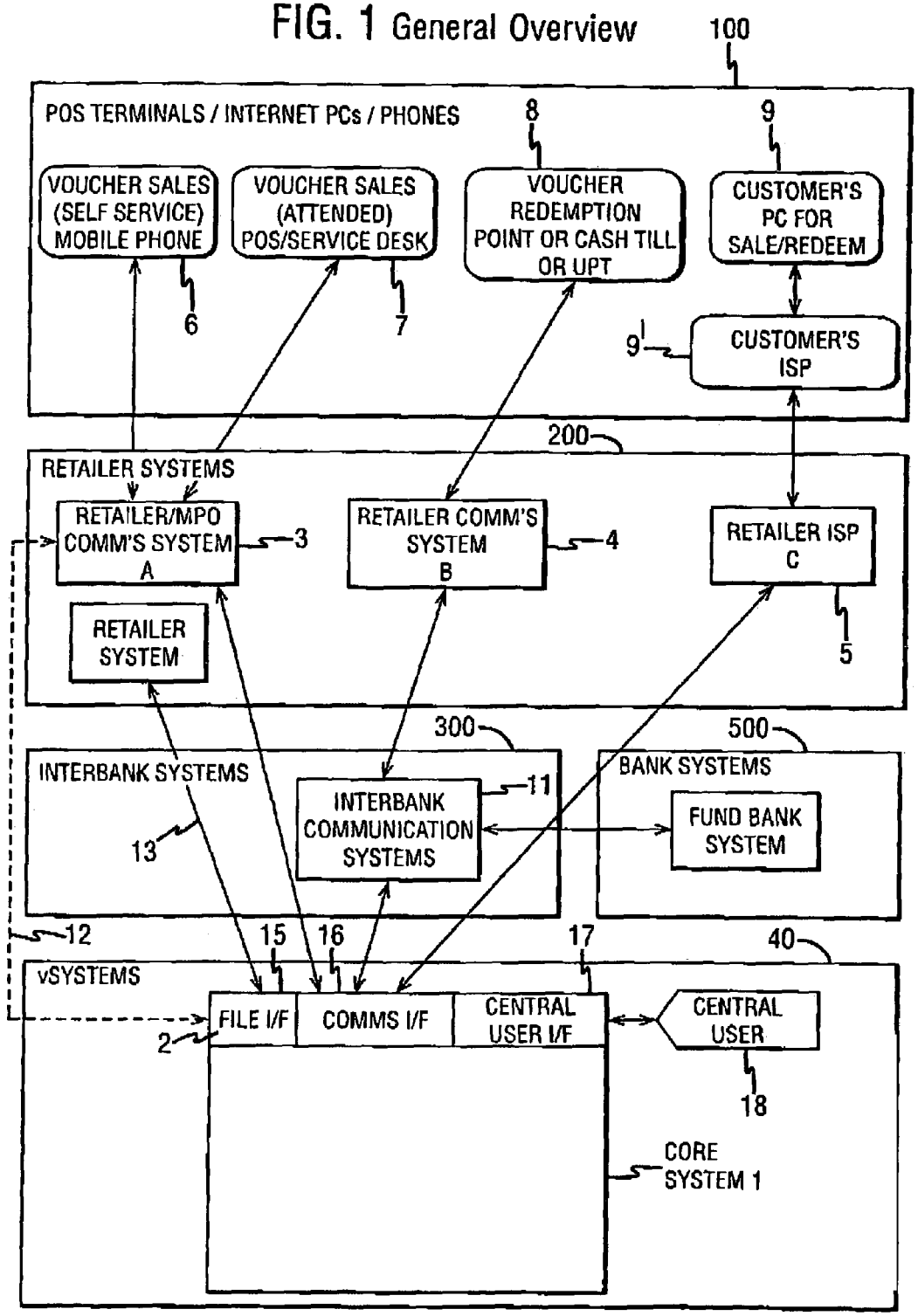
FIG. 1 General Overview

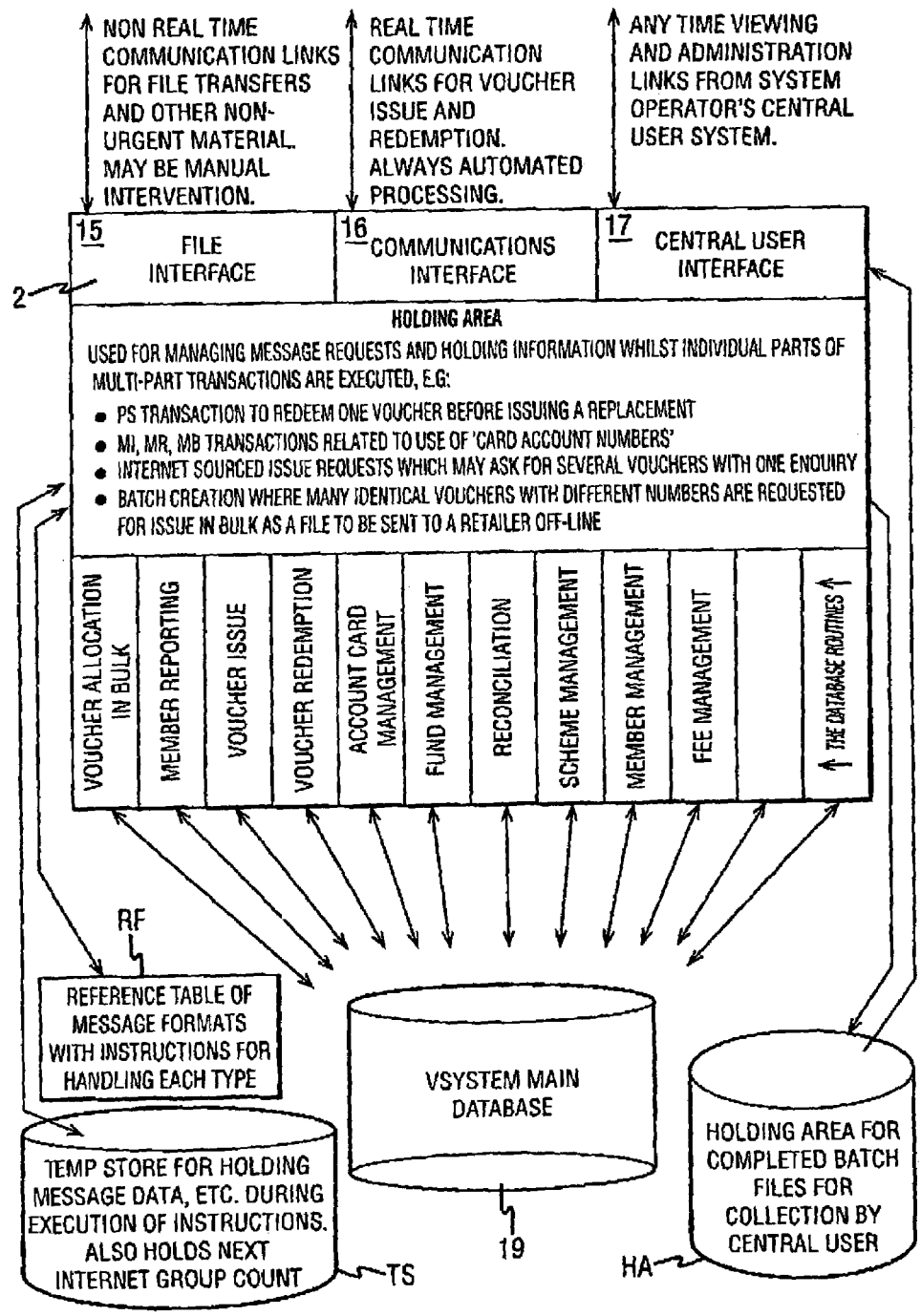
FIG. 2 Structure of Core System (1)

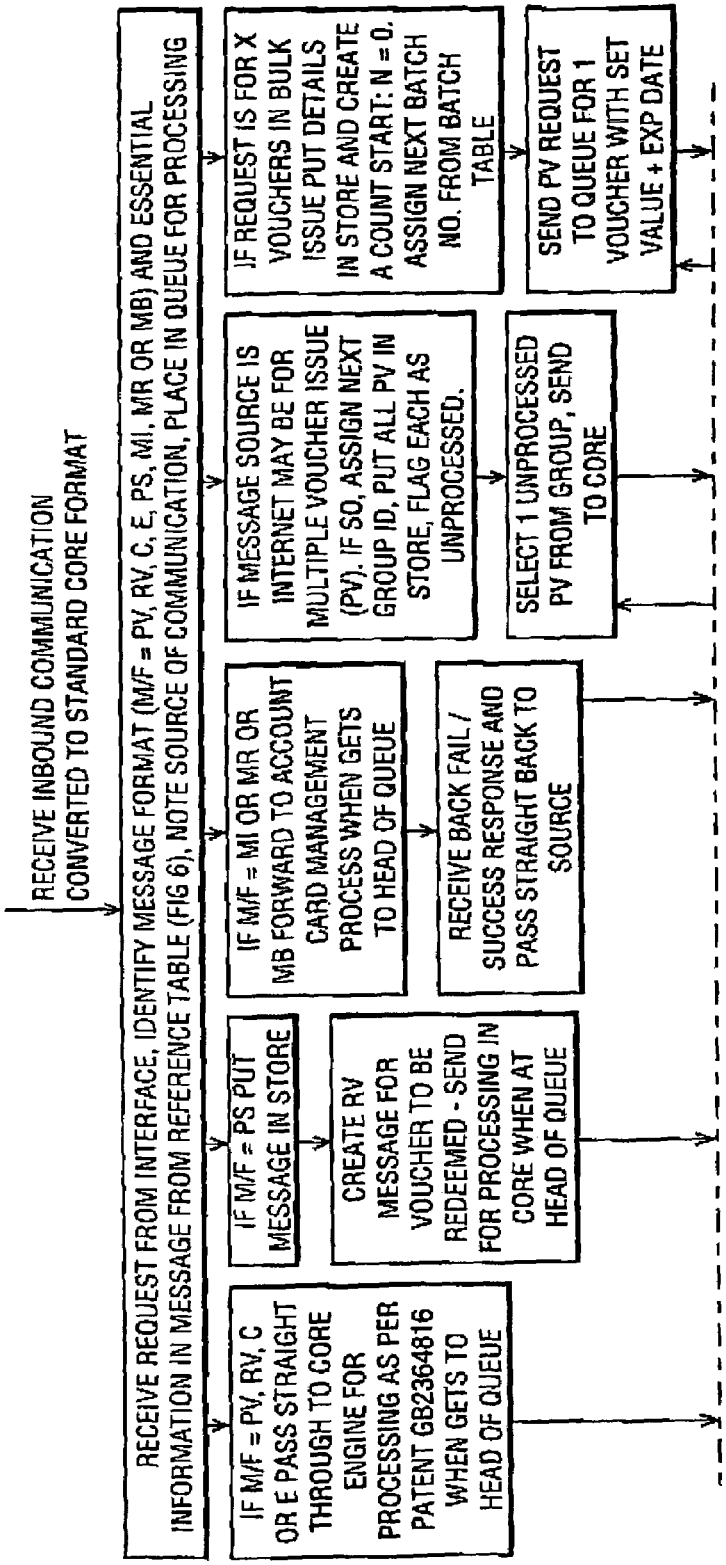

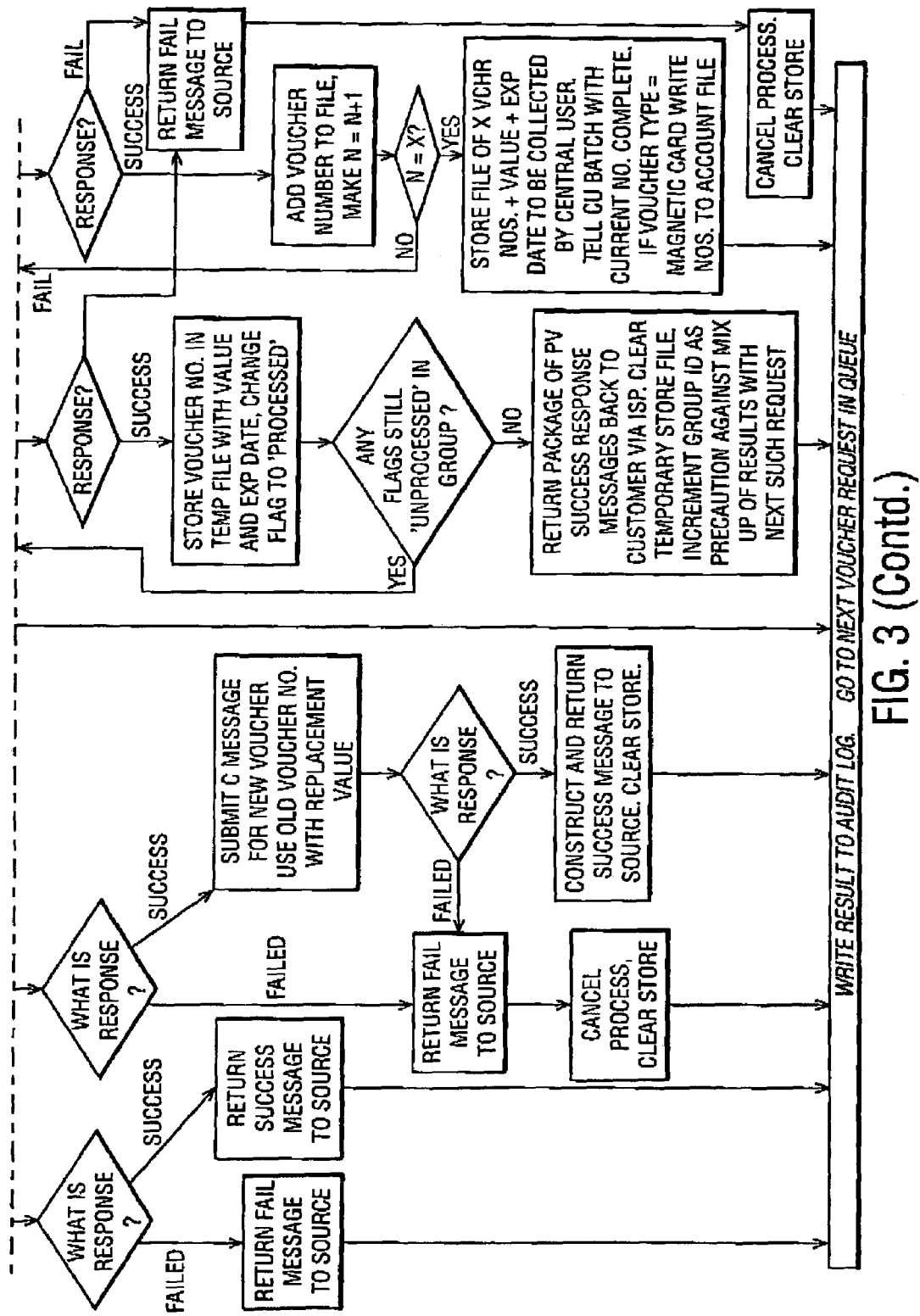
FIG. 3 (Contd.)

FIG. 6

| MESSAGE FORMAT | PURPOSE | ESSENTIAL DATA SENT | ESSENTIAL DATA RETURNED |
|---|---|---|---|
| PV | PURCHASE ANY VOUCHER EXCEPT GIFT CARD | IIN + PRODUCT CODE REQUIRED, VALUE WANTED, TERMINAL ID | REQUEST SUCCESSFUL OR NOT, UNIQUE VOUCHER NO., VALUE, EXPIRY DATE |
| RV | REDEEM ANY VOUCHER EXCEPT GIFT CARD | VOUCHER NO., VALUE, TERMINAL ID | REQUEST SUCCESSFUL OR NOT |
| C | REQUEST CHANGE VOUCHER ANY TYPE NOT GIFT CARD. [ONLY ONE CHANGE VOUCHER CAN BE ISSUED EACH REDEEM] | VALUE WANTED, UNIQUE NO. OF VOUCHER JUST REDEEMED, TERMINAL ID | REQUEST SUCCESSFUL OR NOT, UNIQUE VOUCHER NO. OF NEW CHANGE VOUCHER, VALUE, EXPIRY DATE |
| E | REQUEST EXCHANGE VOUCHER ANY TYPE NOT GIFT CARD. [MANY EXCHANGE VOUCHERS CAN BE ISSUED PER REDEEM] | VALUE WANTED, UNIQUE NO. OF VOUCHER JUST REDEEMED, TERMINAL ID | REQUEST SUCCESSFUL OR NOT, UNIQUE VOUCHER NO. OF NEW EXCHANGE VOUCHER, VALUE, EXPIRY DATE |
| PS | LINKED TRANSACTION ANY VOUCHER EXCEPT GIFT CARD: REPLACE ONE VOUCHER WITH ANOTHER OF DIFFERENT VALUE I.E. TOP UP OR TOP DOWN | VOUCHER NO. OF VOUCHER TO BE REDEEMED, VALUE OF VOUCHER TO BE REDEEMED, VALUE OF NEW REPLACEMENT VOUCHER (IF MORE THAN OLD VALUE THIS IS TOP UP AND IF LESS THIS TOP DOWN AND IS EFFECTIVELY RV + C AS A SINGLE TRANSACTION), TERMINAL ID | REQUEST SUCCESSFUL OR NOT, UNIQUE VOUCHER NO. OF NEW VOUCHER, ITS VALUE AND EXPIRY DATE |
| MI | ADD VALUE TO MAGNETIC STRIPE (= GIFT) CARD VCHR | MAG STRIPE CARD NO., VALUE TO BE ADDED, TERMINAL ID | REQUEST SUCCESSFUL OR NOT. MAG STRIPE CARD NO., NEW (INCREASED) VALUE, EXPIRY DATE |
| MR | REDUCE VALUE ON MAG.(= GIFT) STRIPE CARD VCHR | MAG STRIPE CARD NO., VALUE TO BE TAKEN OFF, TERMINAL ID | REQUEST SUCCESSFUL OR NOT. MAG STRIPE CARD NO.. NEW (REDUCED) VALUE, EXPIRY DATE |
| MB | BALANCE ENQUIRY ON MAGNETIC STRIPE CARD | MAG. STRIPE CARD NO., TERMINAL ID | REQUEST SUCCESSFUL OR NOT, MAG. STRIPE CARD NO., BALANCE, EXPIRY DATE. |

FIG. 7

| ITEM | DETAIL |
|---|---|
| VOUCHER NUMBER | UNIQUE, VARIABLE BUT TYPICALLY 19 DIGIT NUMBER |
| LINKED VOUCHER NUMBER | IF VOUCHER WAS CREATED AS A CHANGE OR EXCHANGE OR PS (SEE ABOVE) THEN PREVIOUS VOUCHER NUMBER IS RECORDED |
| TYPE | STANDARD ISSUE, BULK ISSUE, CHANGE, EXCHANGE OR MAGNETIC CARD |
| TERMINAL ID WHERE ISSUED | CAN BE TRACED TO RETAILER AND SITE RESPONSIBLE FOR ISSUE |
| TIME OF ISSUE | STORED TO INCLUDE DATE AND TIME TO THE SECOND |
| VALUE | CAN BE NIL UPWARDS IN INCREMENTS OF 0.01 CURRENCY UNITS |
| STATUS | PRIMARILY ISSUED (UNCASHED) OR REDEEMED (CASHED) BUT OTHER OPTIONS SUCH AS 'REFER', 'COMPROMISED', 'EXPIRED' EXIST TO MANAGE SPECIAL SITUATIONS. |
| VALID FROM DATE | ONLY APPLIES IF A BULK ISSUE VOUCHER |
| VALID TO / EXPIRY DATE | AFTER THIS DATE THE VOUCHER IS NO LONGER VALID AND ITS STATUS IS RESET TO 'EXPIRED' |
| TERMINAL ID WHERE REDEEMED | CAN BE TRACED TO RETAILER AND SITE RESPONSIBLE FOR REDEEMED |
| TIME OF REDEMPTION | STORED TO INCLUDE DATE AND TIME TO THE SECOND |

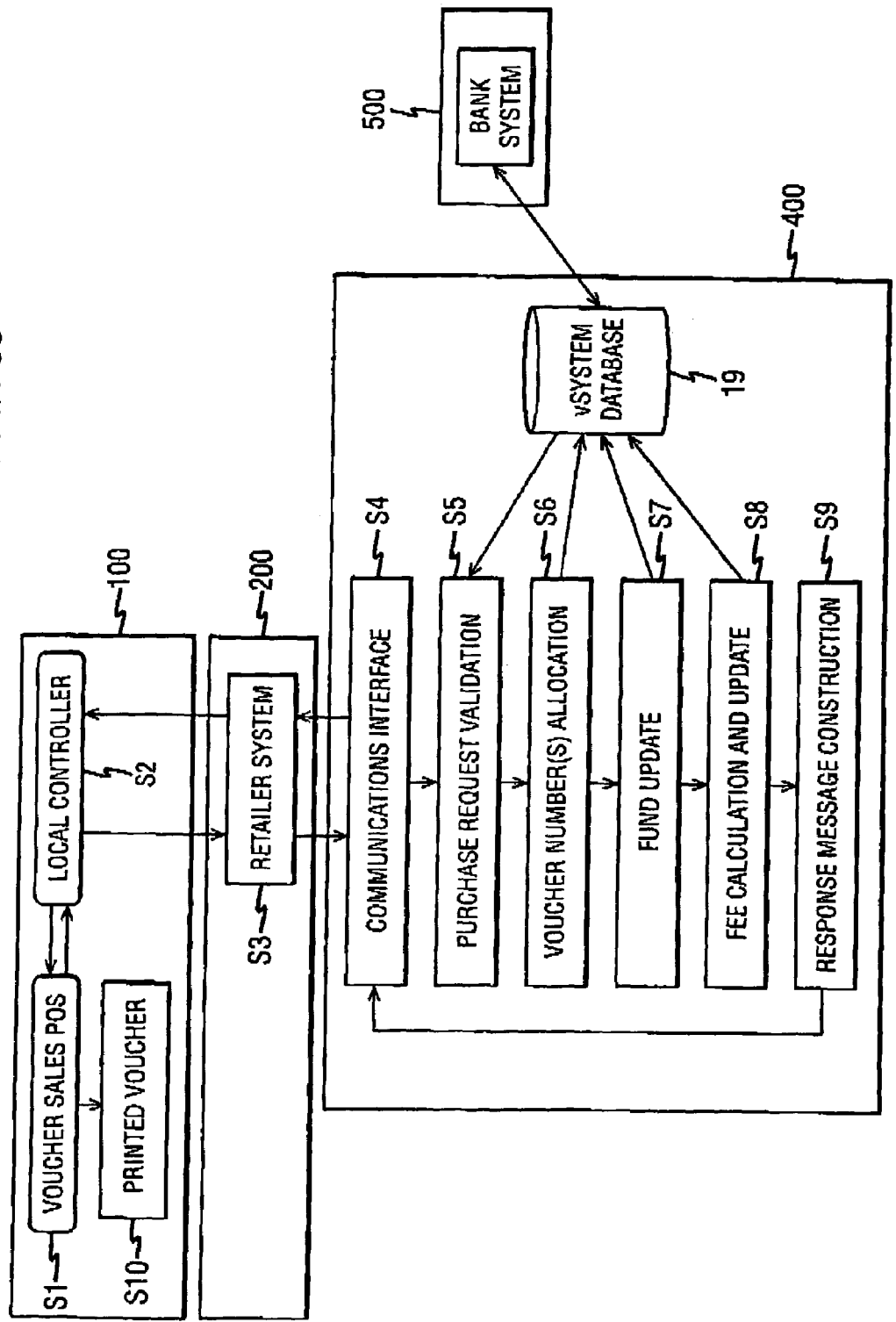
FIG. 8 Scenario-Purchase from POS

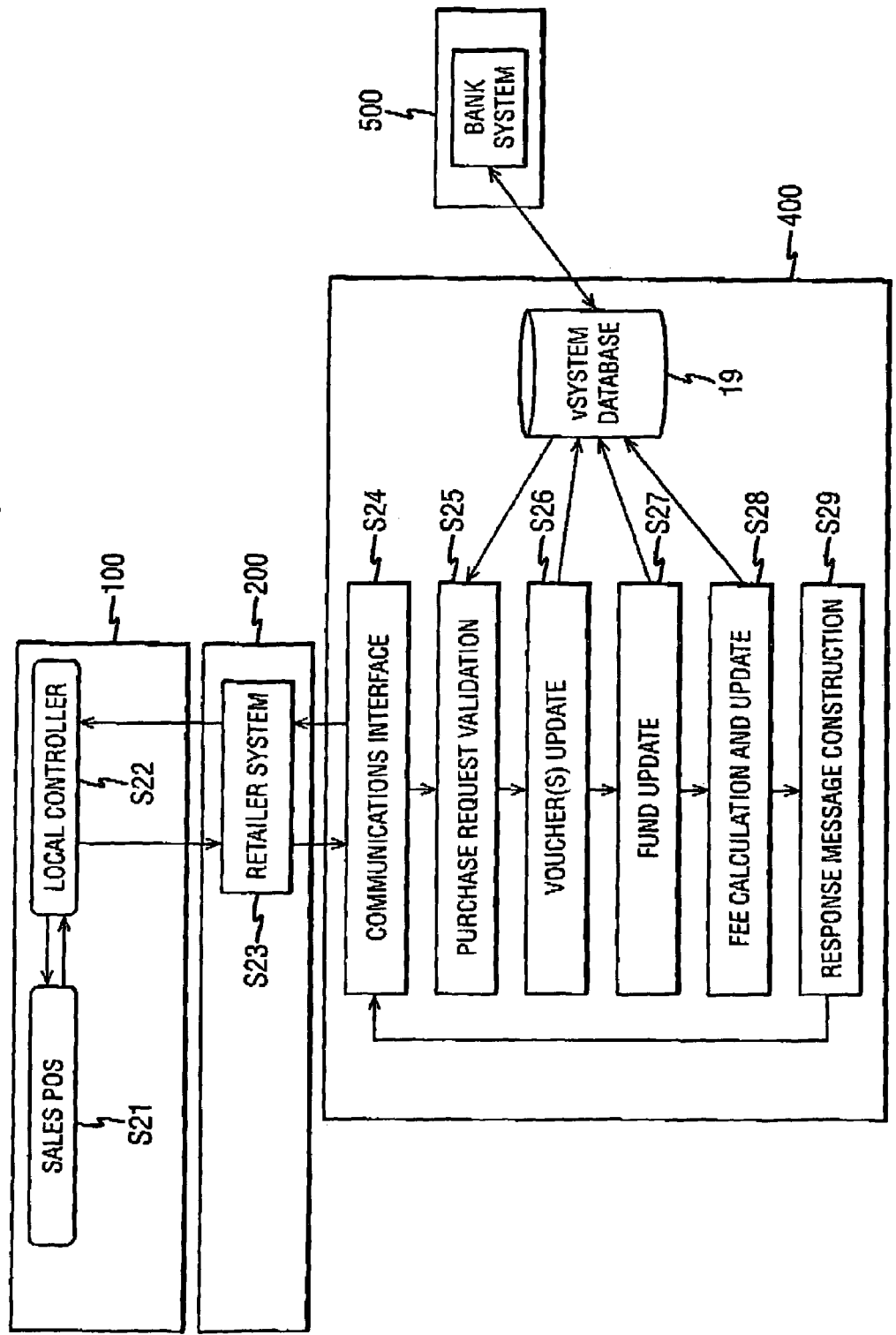

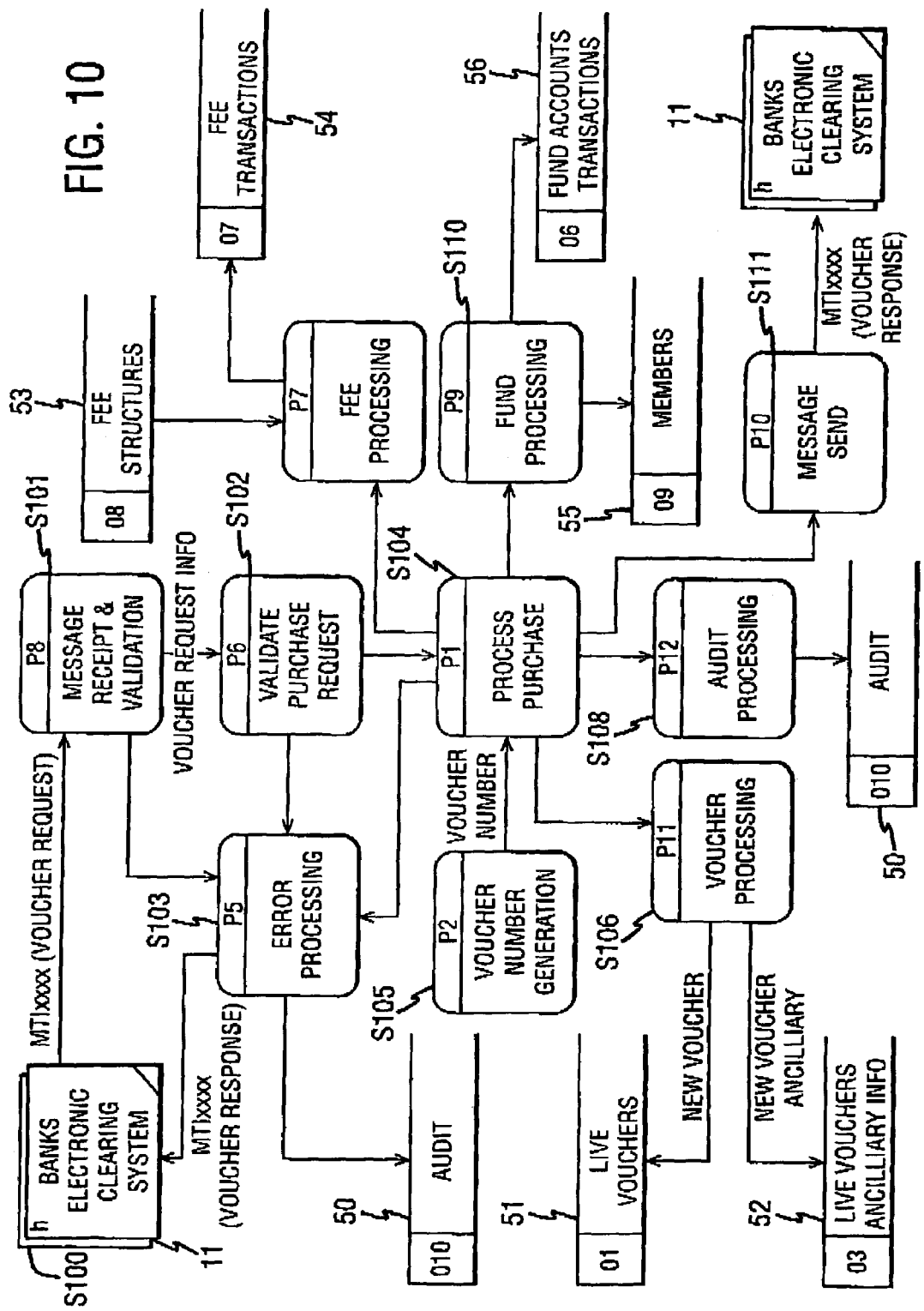

FIG. 12 Batch Table Content

FOR EACH BATCH CREATED IN A BULK ISSUE PROCESS THE FOLLOWING INFORMATION IS STORED AS A MINIMUM:

| ITEM | DETAIL |
|---|---|
| BATCH NUMBER | SIMPLE INCREMENT IN ORDER OF USE: 1, 2, 3, 4, .... POSTED TO VOUCHER TABLE RECORD AGAINST EACH VOUCHER NO. CREATED IN BATCH |
| DATE CREATED | DD/MM/YYYY |
| VALID FROM DATE (AND TIME) | AN INPUT PARAMETER SET BY CENTRAL USER AS PART OF INSTRUCTION TO CREATE BATCH. ASSIGNED TO ALL VOUCHERS CREATED IN ASSOCIATED BULK ISSUE PROCESS. DD/MM/YYYY BUT IN REFINEMENT OF SYSTEM COULD INCLUDE A TIME OF DAY HH:MM |
| EXPIRY DATE (AND TIME) | A SYSTEM CALCULATED FIGURE (WHICH MAY BE FIXED INPUT) BASED UPON REQUIREMENTS SET BY CENTRAL USER AS PART OF INSTRUCTION TO CREATE BATCH. WILL BE COMMON FOR ALL VOUCHERS CREATED IN ASSOCIATED BULK ISSUE PROCESS. DD/MM/YYYY BUT IN REFINEMENT OF SYSTEM COULD INCLUDE A TIME OF DAY HH:MM |
| AMOUNT | AN INPUT PARAMETER SET BY CENTRAL USER AS PART OF INSTRUCTION TO CREATE BATCH. ASSIGNED TO ALL VOUCHERS CREATED IN ASSOCIATED BULK ISSUE PROCESS. MUST FIT WITHIN PRODUCT PARAMETERS DEFINED BY PRODUCT OWNER. |
| PRODUCT NUMBER | AN INPUT PARAMETER SET BY CENTRAL USER AS PART OF INSTRUCTION TO CREATE BATCH. ASSIGNED TO ALL VOUCHERS CREATED IN ASSOCIATED BULK ISSUE PROCESS. IIN + PRODUCT CODE (=VIN), TOTAL OF 9 DIGITS, THE FIRST 9 OF EACH VOUCHER NUMBER |
| VOUCHER TYPE | AN INPUT PARAMETER SET BY CENTRAL USER AS PART OF INSTRUCTION TO CREATE BATCH. ASSIGNED TO ALL VOUCHERS CREATED IN ASSOCIATED BULK ISSUE PROCESS. SET TO EITHER 'BULK ISSUE' (NORMAL) OR 'MAGNETIC CARD', USED ONLY IF THE PROCESS IS TO CREATE A BATCH OF ACCOUNT CARDS. |
| BATCH SIZE | THE NUMBER (Z) OF INDIVIDUAL VOUCHERS TO BE CREATED IN THE BATCH DURING BULK ISSUE PROCESS. AN INPUT PARAMETER SET BY CENTRAL USER AS PART OF INSTRUCTION TO CREATE BATCH. INTEGER - UNLIMITED SIZE BUT RECOMMENDED LIMIT 100,000 FOR EASE OF SUBSEQUENT MANAGEMENT OF BATCHES |
| VOUCHER NUMBERS | LIST OF ALL Z VOUCHER NUMBERS IN BATCH CREATED DURING BULK ISSUE PROCESS |

FIG. 14 Account Card Management

THE 3 MESSAGE FORMATS OF MI, MR AND MB ARE FORWARDED TO THE ACCOUNT CARD MANAGEMENT PROCESS FOR ACTION. IN ITS TURN THIS REFERENCES THE ACCOUNTS TABLE HELD IN THE VSYSTEM MAIN DATABASE. THIS TABLE IS STRUCTURED THUS:

| ITEM | DETAIL |
|---|---|
| ACCOUNT CARD NUMBER | THIS IS A NORMAL VSYSTEM NUMBER OF TYPE 'MAGNETIC CARD' CONSISTENT WITH THE PRODUCT (=IIN + VIN) FOR WHICH IT IS BEING USED. THESE NUMBERS ARE WRITTEN TO THE TABLE WHEN THE BULK ISSUE PROCESS, MANAGED BY THE 'HOLDING AREA', CREATES A BATCH FILE OF 'MAGNETIC CARD' TYPE VOUCHER NUMBERS. |
| CURRENT ASSOCIATED LIVE VOUCHER NUMBER (CALVN) | A SINGLE VSYSTEM NUMBER OF TYPE 'MAGNETIC CARD' NOT NECESSARILY SAME PRODUCT TYPE AS ITS ASSOCIATED ACCOUNT CARD NUMBER. WHEN ACCOUNT CARD NO. IS FIRST WRITTEN SAME NUMBER WILL BE WRITTEN HERE. SUBSEQUENTLY, EACH TIME A MESSAGE FORMAT MI OR MR IS EXECUTED THIS VOUCHER NUMBER WILL BE CHANGED. |
| CURRENT ASSOCIATED VALUE (CAV) | THE VALUE OF THE CURRENT ASSOCIATED LIVE VOUCHER NUMBER. WHEN ACCOUNT CARD NO. IS FIRST WRITTEN ITS VALUE (SHOULD BE 0) WILL BE WRITTEN HERE. SUBSEQUENTLY, EACH TIME A MESSAGE FORMAT MI OR MR IS EXCUTED THIS VALUE WILL BE CHANGED. |
| CURRENT EXPIRY DATE (CAED) | THE EXPIRY DATE OF THE CURRENT ASSOCIATED LIVE VOUCHER NUMBER. WHEN ACCOUNT CARD NO. IS FIRST WRITTEN ITS EXPIRY DATE WILL BE WRITTEN HERE. SUBSEQUENTLY, EACH TIME A MESSAGE FORMAT MI OR MR IS EXECUTED THIS DATE WILL BE REWRITTEN. |

THE TRANSACTION PROCESS FLOWS ARE:

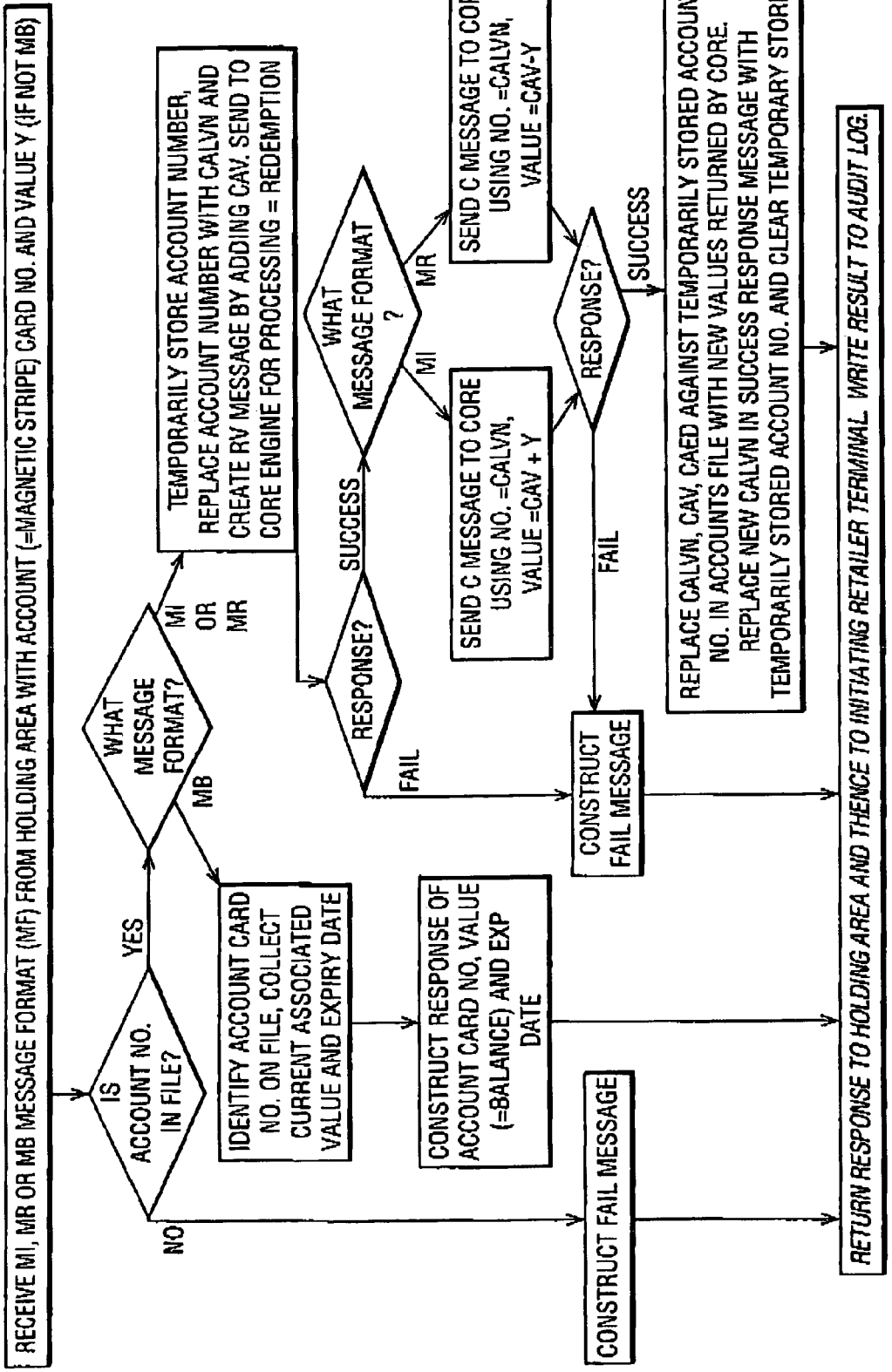

ELECTRONIC PROCESSING SYSTEM

CROSS REFERENCE TO RELATED APPLICATIONS

This application is a Continuation-in-Part of PCT International Application No. PCT/1GB2003/1005234, filed Dec. 1, 2003, which claimed priority of Great Britain Patent Application No. 0227958.6, filed Nov. 29, 2002, the content of both of which is incorporated herein by reference.

The present invention concerns an electronic processing system. It is concerned with improvements to the basic system described in GB Patent Specification No. GB2364816.

BACKGROUND OF THE INVENTION

As disclosed in this prior specification it has long been appreciated that paper-based transactions such as checks or gift vouchers for redemption are both costly to administer and prone to forgery. In addition as businesses world-wide increasingly out-source non-core activities to specialist third parties, it is apparent that there is a need for a flexible and secure money transfer system for handling even relatively small sums of money so as to accommodate retail transactions which at the lower level can correspond to single inexpensive items in a retail store. However, the processor system disclosed in the above GB Patent Specification, whilst extremely flexible in some aspects is essentially concerned with handling individual transactions. Thus the present invention is concerned with providing improvements to the basic processor system disclosed in GB Patent Specification No. 2364816 so as to provide added functionality, thus substantially widening the applicability of the system in a number of aspects.

SUMMARY OF THE INVENTION

A processor system which can generate coded numbers representing money in response to received requests from third parties which can for example be retailer organization. The system can generate numbers for each request and contain at least one fund table which is incremented when a request for a coded number is received or decremented when a coded number is redeemed.

BRIEF DESCRIPTION OF THE DRAWINGS

FIG. 1 is a block diagram showing a general over-view of an electronic processor and associated peripheral terminals which are in accordance with an embodiment of the present invention;

FIG. 2 is a diagram showing the main components of the core system of FIG. 1;

FIG. 3 is a flow diagram showing the operation of a part of the core system of FIG. 2;

FIG. 6 is a table showing message formats to be used in the overall system;

FIG. 7 is a table showing key data held in a voucher table against each voucher number;

FIG. 8 is a data flow diagram illustrating the purchase of a cash voucher;

FIG. 9 is a data flow diagram showing the redemption of a cash voucher at a point of sale terminal;

FIG. 10 is a more detailed flow diagram of the purchase of a cash voucher;

FIG. 12 shows a table setting out the basic data items held in batch table 30.

FIG. 14 shows data held in a batch table of the main database.

FIG. 15 shows the flow of transactions in one mode of operation of the system of FIG. 1.

DETAILED DESCRIPTION OF THE INVENTION

Figure 4:
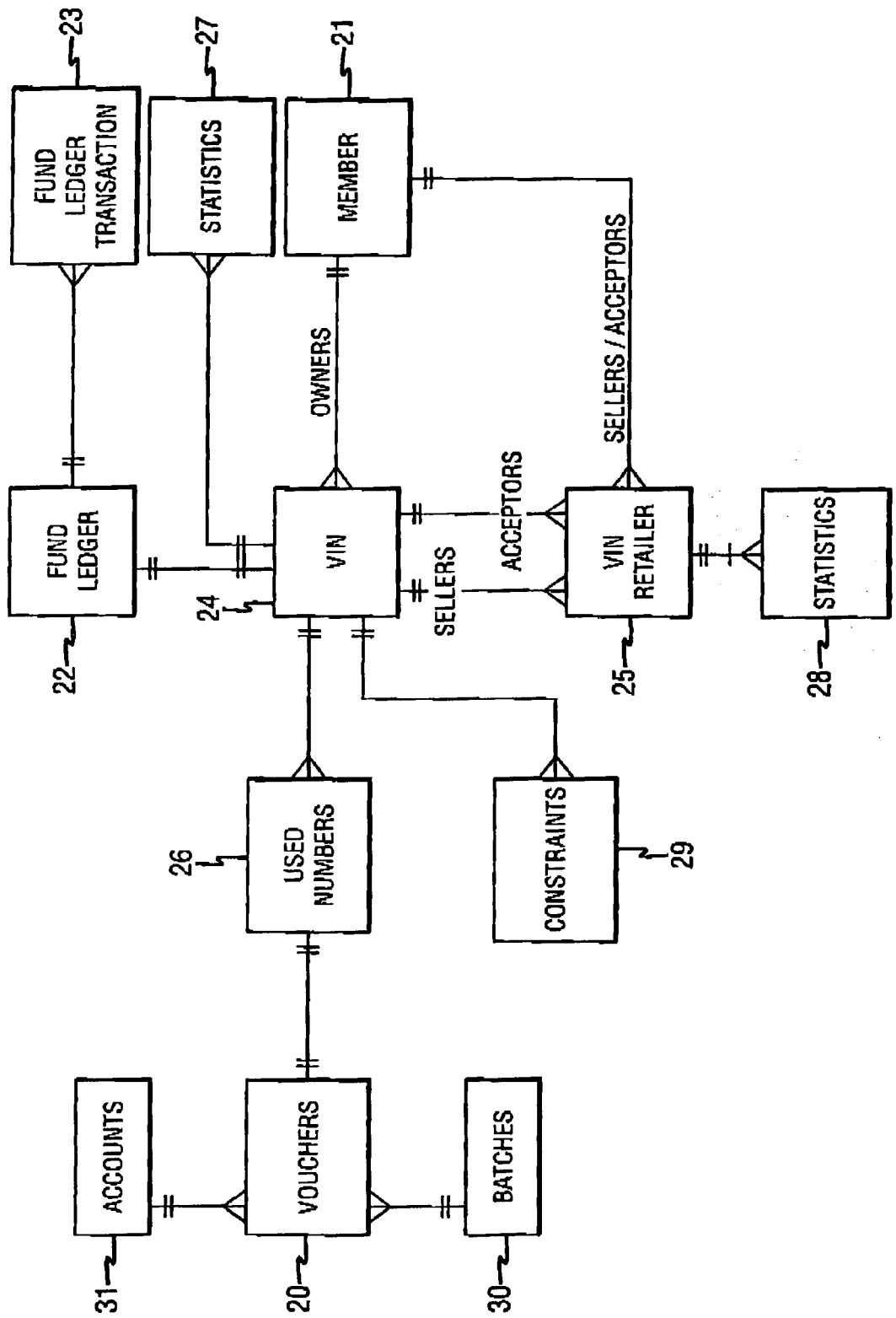
FIG. 4 is a block diagram showing the main data base tables of the electronic processor of FIG. 1.

The following detailed description of the invention refers to the accompanying drawings. Although the description includes exemplary implementations, other implementations are possible, and changes may be made to the implementation described without departing from the spirit and scope of the invention. The following detailed description does not limit the invention. Instead, the scope of the invention is defined by the appended claims. Whenever possible, the same reference numbers will be used throughout the drawings and the following description to refer to the same or like parts.

Referring now to FIG. 1 of the accompanying drawings this shows an electronic transaction system which has been enhanced with respect to the system disclosed in GB Patent Specification No. GB2364816 by the present applicants and which is incorporated in this specification by way of reference. The term "cash voucher" is used in the present specification in the same sense as in GB Patent Specification No. GB2364816.

The system shown in FIG. 1 has five layers of functionality indicated separately at 100, 200, 300, 400 and 500.

The first layer of functionality is shown at 100 and comprises the terminals at which customers interact with the overall system.

Thus it will be seen that retailer A has a cash voucher sales terminal 6 which is self-service, possibly using a mobile phone and a cash voucher sales terminal 7 which is attended. Retailer B has a voucher redemption terminal 8 which may or may not be attended but retailer C handles sales and redemptions of cash vouchers only over the Internet.

In functional layer 100 the self service terminal 6 essentially comprises a manual data arrangement such as a keyboard, a display terminal and a reader for reading credit/debit cards (which together could be an ATM) or for validating or accepting cash. Alternatively this could be a mobile phone making use of its SIM card for security and the customer's account with the mobile phone operator for payment. It may also include a printer for giving a hard copy of the voucher. A customer wishing to purchase a cash voucher will carry out a sequence of actions based on his/her PIN and similar to those used to obtain cash from a cash dispenser. The terminal 7 which is attended will also have a manual data output arrangement which will be used by the attendant and additionally can take cash or any other payment medium acceptable to the retailer in exchange for the issuance of a cash voucher. Naturally the attendant will be able to carry out additional verification of the customer identity should this be required to verify the use of a credit/debit card or in connection with Money Laundering regulation compliance checks.

The second layer of functionality 200 represents retail companies with which customers deal via layer 100 by either purchasing cash vouchers or redeeming previously purchased cash vouchers for goods, or cash if the system is used for money transfer.

Retailer B shown at 4 has a redemption point 8 at which cash vouchers can be redeemed either for cash or for goods, whilst retailer C, shown at 5, has an Internet based system by means of which a customer can obtain cash vouchers over the Internet. In order to do this the customer must have Internet access and this can be provided in a number of different ways such as via any Internet PC or a mobile phone. Typically the user will have a PC 9, with a modem so as to be able to contact the Internet Service Provider (ISP) 5 of retailer C via the users own ISP 9'.

In the second layer 200 of the general system new data entered at the terminals in layer 100 is processed by the retailers for communication to the interface 2 of the core system 1 in functional layer 400.

The functional layer 200 essentially consists of a second level of validation and then encryption of the data into a format suitable for secure transmission to the layer 400. This transmission can either be by the well known Interbank Communication System as shown at 11 in functional layer 300 or alternatively can be made direct from the retailer. Even in the second case the format of the encrypted data can be the standard MTIxxxx format used in the Interbank Communication System. Additionally a retailer can at either of layers 100 or 200 introduce constraints on the redemption of vouchers.

The other essential function of layer 200 is the decryption of messages received from layer 400.

The dotted line 12 shown linking layers 200 and 400 shows an optional linkage between a retailer system in layer 200 with the layer 400 which need not use the format of whatever communication protocol is employed. This link 12 can be used to transfer non-urgent data such as additional retailer held data concerning cash voucher and management information for the retailers' own analysis and records. Thus this link 12 does not necessitate the encryption used when details of cash vouchers are being transmitted between the functional layers.

Additional link 13 is shown linking a retailer 14 in layer 200 to the core system 1 located in layer 400. This link 13 can transfer bulk allocation files containing details of vouchers to be allocated in bulk and as such can be used for allocating blocks of cash vouchers to be used perhaps as loyalty rewards or for promotional schemes to be discussed later.

Turning now to the core system 1, its structure is shown in greater detail in FIG. 2. The overall functionality of the core system 1 includes the rendering and processing of voucher purchase and redemption, the bulk allocation of vouchers, advice of the allocated voucher numbers to recipients, and the management of voucher funds.

Thus associated with the two communication lines 12 and 13 which connect with the system interface is a functional area 32 dealing with voucher allocation in bulk as will be described hereinafter and a functional area 33 dealing with non-urgent data such as management information for participants. This area communicates via the interface section 15.

The other functional areas or processing subsystems of the core processor 1 communicate with functional layers 100, 200 and 300 via the interface section 16. These are functional areas 34, 35 and 36 which respectively relate to voucher issuer management (and thus product management), voucher redemption and account card management.

The most important of the remaining functional areas or processing subsystems of the system 1 are area 37 which deals with voucher issuer (and thus product) management, area 38, which deals with fee management, area 39 which deals with reconciliation, area 40 which deals with member management and area 41 which deals with account card management. The systems interface also includes a holding area (HA) in which multiple requests are held and managed in a manner to be described in greater detail hereinafter. Also shown in FIG. 2 are storage areas RF and TS. It will be appreciated that storage areas RF and TS could both be incorporated in database 19. Also shown in FIG. 2 are two storage areas holding the routines which control the transfer of data between the tables of database 19. Area RF stores reference tables by means of which the message formats of incoming messages can be determined. TS is a temporary store for holding message data during the execution of instructions and as will be described internet group counts. However the holding section, as a sample example, operates in such a way that, when serving an internet user who wishes to purchase vouchers, a purchaser's PC can display an order screen for vouchers allowing the purchaser to select several vouchers, all for the same product but of possibly differing denominations (e.g. 5@£10 and 4@£5 giving a total of £70 to be claimed from their credit/debit card account) When the customer's request for a plurality of voucher numbers is received via the ISPs at the communications interface 16, the multiple request is held in the holding area HA and individual voucher requests are submitted sequentially to the core system processes which would return a valid number to the holding area after which a new individual voucher request would be sent in. When the iterative process of requesting all the required vouchers had been completed the communications interface would release the full set of (9 in the example) valid numbers with their associated values back via the ISPs to the purchaser's PC. The System database 19 will simply record these as individual vouchers issued. The process flow for this activity is shown in the fourth column of FIG. 3.

Referring now to FIG. 3 of the drawings, this shows the main processes carried out in the holding area in response to received messages. These messages have to have a predetermined message format if they are to be processed by the system. There are in this embodiment, 8 basic message formats which can be received by and returned via interface 2. Instructions for handling these 8 formats are held in reference table RT shown in FIG. 2 and the detailed information associated with each message format is shown in FIG. 6 and the identification of the message formats can be carved out by an identification processing subsystem.

FIG. 6 has four columns the first of which is a short indication of the message format. The second column indicates the purpose of the message. The third column sets out the essential data to be sent for the core system to be able to process the message whilst the final column sets out the essential data to be returned to the originator.

Thus at the first step shown in FIG. 3 a message is received and its type (message format) is identified. The subsequent processing as described later, depends on the message format. Each of the subsequent steps shown in FIG. 3 is self-explanatory. Each successful request will generate one or more ordered numbers for storage in the appropriate table in the database 19. Any failed request will generate a "transaction fail" request to be returned to the originator.

Having given an overview of an embodiment of the electronic processing system there will now be described purely by way of example the components that make up the core system 1 and interface 2.

The interface 2 has a section 15 for receiving and transmitting messages via links 12 and 13. The interface 2 also includes a section 16 which is dedicated to receiving and transmitting messages in real time in a standard format over the Interbank Communication System 11 or direct from or to retailers A, B and C as shown by the paths of unnumbered links to the interface 2. The other main interface of the central processor 1 is shown at 17 and is the interface used by the system operator 18, that is the organization managing the overall system on behalf of the participating members.

Turning now to database 19, this houses a plurality of data base tables used in the processing of cash vouchers. The main tables of data base 19 are shown in FIG. 4 of the accompanying drawings and includes a main table 20 holding in appropriate registers data of live and redeemed cash vouchers. This table 20 is in the present embodiment divided into sections including a live voucher table which holds details of all cash vouchers which have not been redeemed, and a historical voucher table which may hold details of all cash vouchers which have been redeemed. The term "may" is used as it may be necessary to archive historic voucher details in an archive section after a predetermined time has elapsed. Additionally the table 20 will hold details of unclaimed vouchers. The key data held for each voucher in table 20 is set out in FIG. 7. Other data may be held here depending upon the types of data analysis that the scheme operator may wish to provide for their members. If extra member sourced data is to be held here it will be received via the off-line link 12. Table 21 of the data base 19 holds member's details, namely all those members such as retailers A, B and C and one or more mobile telephone networks which are participating with the cash voucher processing system managed by the system operator. Thus members are either retailers or owners of individual schemes.

Table 22 is a Fund Ledger table and holds in appropriate registers details of the Funds which provide the backing of the cash vouchers listed in the live voucher table whilst table 23 holds details of Fund Ledger transactions which occur when vouchers are issued, redeemed, compromised or expired, etc. Each fund Ledger effectively shadows a physical bank account held at a financial institution indicated at functional layer 500.

Associated with the Funds Ledger table 22 is a Voucher Issuer table 24. This table, again held in appropriate registers, sets out the conditions under which a cash voucher is issued by an Issuer. At this point it is essential to clarify possible relationships between the operators of the core system and those members which participate in the actual process in which customers request and redeem cash vouchers. The members can belong to a range of different categories. These categories are all set out in GB Patent Specification No. GB2364816.

Data held in the Voucher Issuer table 24 includes for example the Fund accounts associated with a voucher, minimum and maximum voucher values, the start date from which the voucher can be redeemed, the duration of the voucher and commission fees relating to the sale and/or redemption of any vouchers. Unless a voucher has an expiry date it would have to remain permanently on the live voucher table of the data base. Duration can be expressed in, if desired by short periods but normally in days, months or years and is calculated at the time of purchase from the voucher start date. This means that promotional vouchers can be created for periods as short as two hours. This is not possible in any known system. Some of the data derived from the Voucher Issuer table may be transferred to the Voucher table 20 for association with a particular cash voucher when it is issued in order to facilitate quick reference when the voucher is redeemed.

It is possible for a Voucher Issuer to set constraints on the redemption of cash vouchers. Examples of the kind of constraints which can be set by a Voucher Issuer and which can be associated with a cash voucher are given in the following passage. These constraints are normally set by the relevant member of the scheme when the cash voucher request is generated in layer 100 or layer 200. Firstly a constraint placed on the purchase or redemption of a cash voucher can be based on a chain of stores. Thus constraints could be placed on a cash voucher so that it can be purchased at only some of a group of retailers, and redeemed at either all of the group or only some of the retailers constituting the group. The selling stores and the redeeming stores need not be the same.

Secondly with or without the above constraints a cash voucher could be limited to redemption for the purchase of certain classes of goods or for cash only, if designed purely as a money transfer product. Naturally the constraint could provide a limit to the number of places where cash can be provided in response to the redemption of a voucher.

Thirdly a voucher could be purchased or redeemed at a range of different retailers including the constraints of the first two examples.

Fourthly the voucher might be a "universal" one in that it can be redeemed at any one of a number of retailers but purchased from a separate organization only linked to the retailers in the sense that it provides a service for them. In any case a cash voucher might have a geographical constraint so that it can only be redeemed in a specific area which might be a town, city, county or country.

The term "retailers" as used in the specification is not limited to retail stores but in fact can include any provider of cash vouchers including mobile phone operators and Government agencies such as the DHSS, banks and Post Offices.

In order to generate the Voucher Issuer table 24, the member table 21 holds in appropriate registers details of those locations that can be used in purchasing or redeeming vouchers. For example, in this context it must be appreciated that a major retailer will have many outlets or stores so that a voucher purchased at one store of a retailer does not have to be valid for all the stores belonging to that retailer. Thus this feature is also under the control of the Voucher Issuer. The member's table 21 holds for each member a unique member identifier number so that a voucher can only be redeemed by an identified number.

Table 25 is dedicated to the scheme retailers and lists all the details defining which retailers can sell or redeem cash vouchers.

It is possible for constraints to be placed on the use of a cash voucher outside the use of the Voucher Issuer table 24. These constraints, if managed by the core system will be held in a separate constraint table 29.

The data base 19 also holds used numbers in a table 26. These need to be stored so that they can be referenced to ensure that the system never issues a number that has previously been issued and later cancelled/used. Table 26 is populated by periodically transferring all voucher numbers in the main table 20 which have a voucher status of 'redeemed', 'expired' and 'compromised'. In addition tables 27 and 28 hold statistical data relating to voucher usage which can be used by management.

Table 30 records in appropriate registers details of batches issued during a bulk issue process to be described later with their associated voucher numbers and table 31 holds details of Card Account numbers issued as a Gift Card with their current associated cash voucher number for use in a manner which will be described later.

It will be appreciated that the data stored on the data base will be very detailed with regard to all the aspects of voucher usage such as amounts, geographical distribution of sales and redemptions and the media used. Thus members can thus easily extract business profiles for use in tuning their publicity, generation of new products, and useful management statistics. An example will be given later as to how this functionality can be used. No current manual or semi automated system can achieve this.

Whilst the present embodiment discloses a single data base at a single location it is of course possible for the various areas and tables of the data base to be distributed over different geographical locations.

Figure 5:
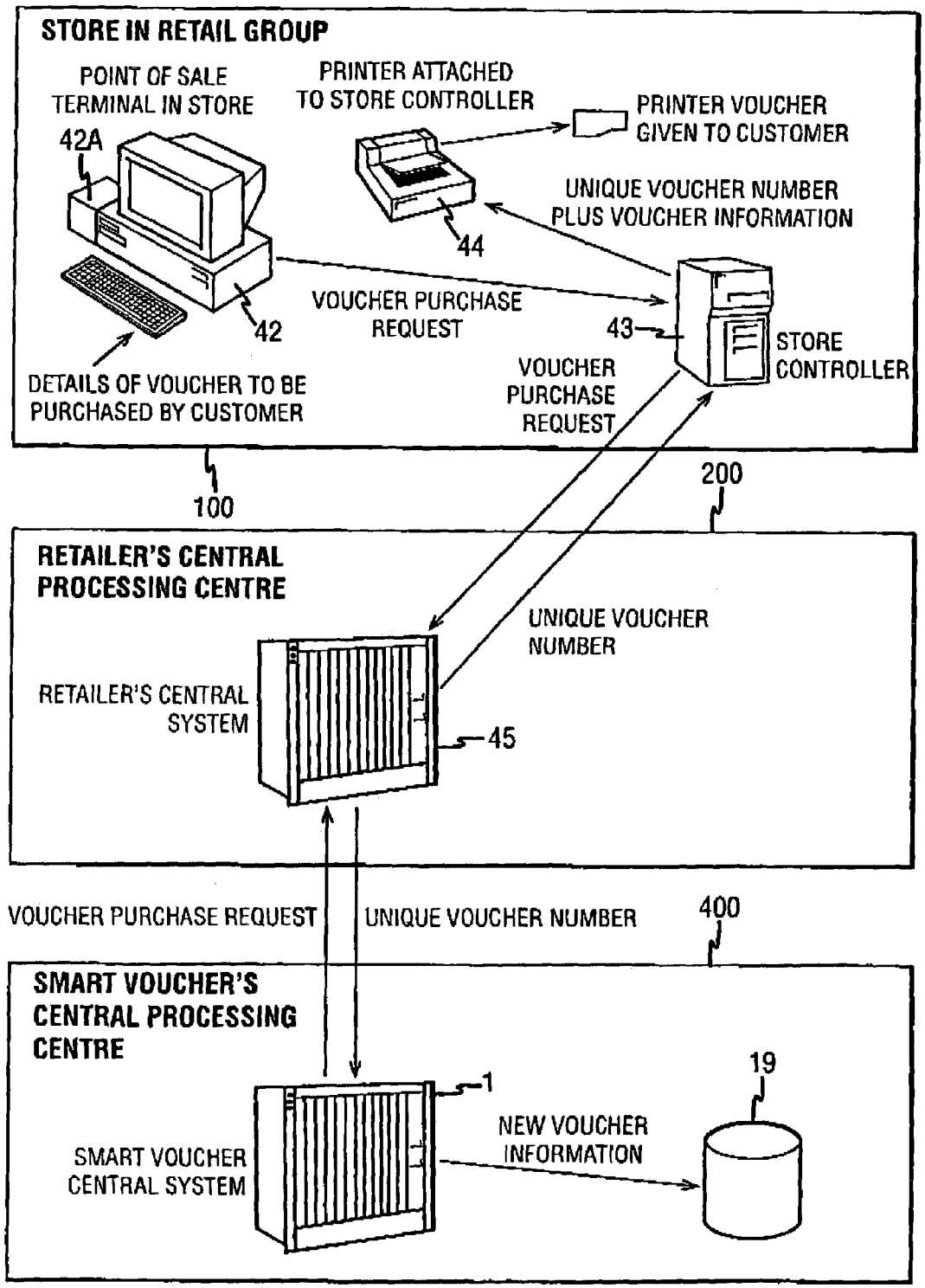
FIG. 5 is a block diagram of hardware for the system of FIG. 1.

Referring now to FIG. 5 of the accompanying drawings this shows hardware which can be used in the general system shown in FIG. 1. The functional layers described in FIG. 1 are also present in FIG. 5 but it will be seen that layer 300, which is optional, has been omitted. Layer 100 includes an electronic point of sale terminal shown at 42 by means of which an assistant can enter details of a cash voucher to be purchased by a customer, whilst 43 indicates a processor located at the actual store where voucher transactions takes place. In a specific embodiment for generating gift cards the sales terminal 42 also comprises a reader 42A for reading a magnetic stripe or the chip on an IC card to determine the account card number stored on it which is used by the central system to identify the current associated cash voucher number. Also shown in layer 100 is a printer 44 for printing an issued cash voucher number and value (if required). The printer may also be capable of printing a bar code representing the voucher number to enable quicker reading of the voucher at a till equipped with a bar code reader when a voucher is to be redeemed. In another embodiment designed for self service use by a customer of a mobile phone operator as retailer the content of layer 100 may comprise a mobile phone instead of a point of sale terminal and the voucher number could be shown on the screen as both a number and a bar code.

The retailer's central processing centre is in layer 200 shown at 45 and the central system 1 is shown in layer 400 including the main data base 19. It is expected that the data volumes and transaction rates of the voucher operation will require substantial computer storage and processing power. The system also needs to have high availability, resilience and security. To satisfy all these requirements it is expected to run the voucher system on an IBM mainframe using IBM's (RTM) operating system (MVS), data base (DB2) and access control and security software (RACF) or on a comparable system. However it will be appreciated that many other known types of computer system can be used including dual and distributed processor systems and subsystems without departing from the scope of the present invention. It will also be appreciated that subsections of the overall system could be hard-wired.

The operation of the system shown in FIG. 1 will now be described in greater detail. Reference has already been made to the concept of cash vouchers and it is to be understood that these are entirely different from paper-based vouchers in that they are "virtual", that is they exist in the form of data. In essence the cash vouchers merely exist as a computer record stored in the secure master data base 19 which can be accessed in real time internationally by any participating member such as a high street retailer, web-based retailer or a mobile phone operator. The computer record is identified by a unique code and as already described contains details which identify the location of the computer record and the factors which define the way in which the voucher can be redeemed. Thus the value of each voucher is stored on a bank account which is dedicated only to funds associated with vouchers. Accordingly when a purchaser purchases a voucher using functional layer 100 the purchaser is provided with a unique code. In turn the unique code enables the system to determine the value, expiry date if any, and constraints as described with reference to the Voucher Issuer table of FIG. 4 or normally set by the VIN (=Product) owner. Thus the purchaser of a cash voucher is given data at the time of the sale concerning the constraints attached to the voucher including the expiry date.

Accordingly, the unique code relating to a purchased voucher is of considerable importance. Thus it should not be possible for the possessor of a valid voucher number to be able to make an educated guess at another valid number and to use it. For example, in a scenario given purely by way of example, if voucher numbers were allocated sequentially with a single check digit then a purchaser of vouchers with the numbers 896657, 896662 and 896670 could reasonably guess that 89668x is a valid number. Only a maximum of ten attempts are needed to determine the value of X.

Thus in the present embodiment the voucher number is a unique 19 digit number. The length is chosen to be compatible with the maximum size currently used in the credit/debit card industry, i.e. it conforms to ISO 8583. The first six digits constitute the IIN (Identification Number) which has been allocated to the systems operator.

The coded number can be divided in the manner shown in Table A.

TABLE A

| Locations 1-6 | Locations 7-9 | Locations 10-18 | Location 19 |
| --- | --- | --- | --- |
| (6 digits) | Code (3 digits) | (9 digits) | (1 digit) |
| Standard for Database Some VIN owners may have their own IIN | Set by seller of voucher | Created randomly by operator system | Calculated from rest by operator system based upon standard algorithm |

It will thus be seen that it is locations 7-9 of the voucher number which enables a participating member of the system to set constraints such as those described earlier in the specification. This division of the coded number can be altered. For example the VIN constraint code in particular need not be 3 digits and could for example be 2.

Additionally the generation of a voucher number involves an algorithm which ensures that numbers are not repeated.

This is fully described in UK Patent Specification No GB2364816 which is incorporated by way of reference in the present specification.

Turning now to FIG. 8 of the accompanying drawings this shows a flow chart box the basic procedures which are followed when a voucher is purchased. It is assumed that the point of purchase is a high street retailer similar to retailer A of FIG. 1 and having a sales terminal 6. Thus a voucher can be purchased along with any other goods available at the store or could be earned as a reward for the amount of purchases just made by the customer. The Interbank System is not shown in this Figure or in FIG. 8 as it is not essential for understanding the process In FIG. 8 step S1 shows that at the sales terminal a sales assistant takes details of the voucher(s) required together with any locally determined product constraints together with any other confirmation and issues a voucher request to a local controller. In step S2 the local controller transmits the request to the retailer system in functional layer 200.

The retailer system at step S3 has the main functions of carrying out additional validation procedures, determining the VIN/constraint code to go in the request, encrypting the voucher request in a suitable manner, and transmitting the encrypted voucher request to function layer 400.

In the present embodiment the retailer system issues a voucher purchase request using the APACS standard 30. This is a standard which allows for private use messages and which defines various data elements and which data elements are mandatory or conditional for each type of message. The APACS standard 30 is the standard used in the (UK) Interbank communication system 11 in functional layer 300 of FIG. 1.

It is to be clearly understood that use of the APACS standard 30 is not fundamental to the basic inventive concept as the use of this standard is not essential to the implementation of the present invention. A user in the United States, for example, might utilise a different format.

The Interbank Communication System 11 is not shown in FIG. 8 (or FIG. 9). This is because in implementing the present invention the Interbank Communication System is only used as an already available and secure conduit for messages.

Thus the encrypted messages can either be sent via the Interbank Communication System or can be sent direct to section 16 of interface 2.

The interface has a form of validation in that it ensures that the request is in the correct format and from a known source. In step S4 the encrypted voucher request is received by the interface 2 and forwarded for purchase request validation in step S5. The purchase request validation procedure includes checking that the retailer's supplied 3 digit VIN/constraint code is for a valid voucher scheme. Additionally, the other criteria of the requested voucher have to conform to the attributes for that particular VIN. In step S6 a voucher number is allocated to each voucher request if no errors have been detected in the validation procedure. The allocation of a voucher number brings about consequential updates to the fund tables which have already been mentioned and which are described in more detail later on and this is done in step S7. At step S8 information concerning the voucher is passed to the management system (not shown) for calculating fees charged by the operator of the system, and at step S9 a response message is returned to section 16 of the communications interface 2.

The calculation of management fees is incidental to the invention concept and can be done on a per-voucher basis on purchase and possibly also on redemption. On the other hand they may be calculated at predetermined intervals on the bulk value of purchased or redeemed vouchers.

If during the preceding processing the voucher request was not validated the response, again in APACs standard format, is negative. In any case the communications interface informs the retailer system of the result and the retailer system in turn informs the local controller of the original terminal. In this example the terminal issues a printed voucher bearing the allocated voucher number. At this point the printer can add a bar code to the value identifying the unique voucher number.

The retailer has the option to print information on the issuance of a voucher. This information can be the voucher number only or the extra descriptive information such as the value, the expiry date and any other conditions of use, onto paper printed to their own choice e.g. plain, branded or a gift card. The number can be printed as a bar code to assist redeeming retailers to quickly process the voucher and manage any product constraints identified by the number.

It will be appreciated that the preceding description has been given from the perspective of a customer being present at an attended terminal.

FIG. 9 deals with the redemption of a voucher. It will be seen that the flow of data in this figure is very similar to that of FIG. 8.

Thus at step S21 the customer presents the sales assistant with the voucher number, the voucher value and the voucher expiry date. It is not essential that the customer provides an actual voucher as printed in step S10 FIG. 8. It will also be appreciated that the provision of the expiry date is an additional security feature, not absolutely and essential. The voucher can be for part payment of goods with the remainder of the payment being made by cash, check/debit card or it can be for the totality of the goods purchased. In fact it is possible to arrange the system so that a purchaser with a voucher worth more than the required goods has a new voucher given for the balance. Naturally if the particular store where the voucher is being redeemed is not also a seller of vouchers of this product this may not be possible. This feature is not available on any other voucher scheme. Quoting the stated voucher number and value the sales assistant (local controller) informs the retailer system of the purchase request at step S22. The retailer assistant and layer 200 will normally have to carry out validation procedures on the request because as already described with regard to the generation of the voucher it may contain details of constraints on its redemption set by the voucher issuer or by the retailer concerned.

If validated, where validation is necessary, the retailer system initiates a payment request and in the present embodiment constructs an MTIxxxx purchase request. The request is sent to the communications interface of layer 400 at step S24 and validation is carried out at step S25. Validation here involves an identification processing subsystem and includes checking that the submitted voucher number and value correspond to a voucher within the voucher table 20 with status 'issued', and whose expiry date is not yet passed. The process might also check the voucher type (FIG. 20) as some types could be used to give rise to extra checks e.g. a bulk issue voucher would have an associated 'valid from date' which would need to have been reached for the transaction to be approved (see later). A valid request causes updating of the voucher table 20 of the main data base 19 at step S26 and of the fund ledger 22 at step S27. At step S28 fee information is transferred to a fee generation system so that the fees due to the system operator can be calculated. The same fee considerations apply as described with regard to FIG. 8. Finally at step S29 the response message is generated in the same format as before and sent via the communications interface to the retailer system. The response message can of course be negative where the original request was invalid. Example rejection messages might be "invalid number", "scheme not valid for this retailer", "wrong value", "voucher not in date", "voucher already redeemed" and "transmission error", or, simply in order to give extra security by limiting the amount of information given out, "transaction failed". The response is transmitted in reverse step 23 to the local controller which passes it on to the assistant at the sales POS terminal who takes appropriate action at the terminal.

The basic steps of purchase and redemption of vouchers is fully described in GB Patent Specification No. GB2364816.

As the purchase and redemption of a voucher involves the transfer of funds into/out of a dedicated bank account the manner in which funds are arranged and managed will now be described. As has already been described each voucher will belong to a particular voucher issuer which also identifies which fund account manages the voucher funds. It will be appreciated that a single fund account can carry funds for different products. Each fund has a "shadow bank account" which in the present embodiment is associated with a nominated physical bank account held at a financial institution.

The overall structure of fund ledgers for different retailers and different products is fully described in GB Patent Specification No. GB2364816 and will not be described any further.

It will be appreciated that the core system manages a number of accounts relating to funds. These are fully set out in GB 2364816.

Details of four examples illustrate how real cash associated with a voucher can move through the banking system are given in UK Patent Specification No GB2364816.

Having described the overall functionality and structure of the processing system real time functions of the core system 1 these will now be described in relation to use of the system with the Interbank Communication System, as this is a likely scenario. Thus in the present embodiment voucher purchase is always triggered by an MTIxxxx request message received at the interface 2. In response to this message the central processor 1 always generates an MTIxxxx response message back to the message's source. Under normal circumstances the response message will contain the voucher number but if any errors are encountered during processing then the response will be a rejection of the purchase request.

Thus in response to the voucher purchase request the core system 1 has the following functionality. It is emphasized that for security concerns all activity in the core system 1 must be via the interfaces 2 and 17.

The procedure is shown in the flow diagram of FIG. 10.

At step S100 an MTIxxxx voucher purchase request message is sent to the core system 1 and the message is received at interface 2, section 16 at step S101 and sent for validation at step S102 and for error processing at step S103. Should these latter two steps find the purchase request invalid an MTIxxxx to this effect is sent back to the interbank communication system 11 and also to the audit section of the data base MTIxxxx's as indicated at 50. If the purchase request is validated at steps S101 and S102 the purchase request is passed to step S104. At this point in the flow diagram a number of linked processes are carried out, it being appreciated that the purchase (and redemption of vouchers) always occur in real time so as to minimize delay at purchase and redemption. Thus at step S105 the voucher number is generated in the manner already described and at step S106 the newly generated voucher is transferred into the appropriate live voucher areas of the vouchers table 20 which have also already been discussed with regard to the main data base tables shown in FIG. 4 and which are indicated in this figure at 51 and 52. Similarly the successful generation of a voucher is audit processed at step S108 and again the result of this processing is stored in the audit tables of the main data base, this being indicated at 50. Another consequence of the successful generation of a voucher is shown at step 109 which is a fee processing step which requires data from fee structure tables 53 in the main data base and which updates the fee transactions tables 54 in the main data base. Additionally at step S110, the core system 1 carries out fund processing as the generation of the voucher requires the setting up of the equivalent funds in the Fund Accounts Transactions tables of the main database and also setting the appropriate data in the member tables of the main data base, these tables being respectively indicated at 55 and 56.

Finally the voucher response containing the voucher and product details are sent at step S111 to the interbank communication system 11.

The steps and data tables involved in voucher redemption are similar to those involved in voucher purchase and will note be described in details.

An important feature is that the fund balance providing the backing for live vouchers is always equal to the total represented by the live vouchers.

Thus the system just described has an integrity checking and reconciliation process which can be automatically triggered at preset times or which also can be manually requested at any time. The reconciliation process involves checking that the total value of live vouchers associated with a fund matches the balance in that funds ledger and again will not be described as it is fully described in GB2364816.

Figure 11:
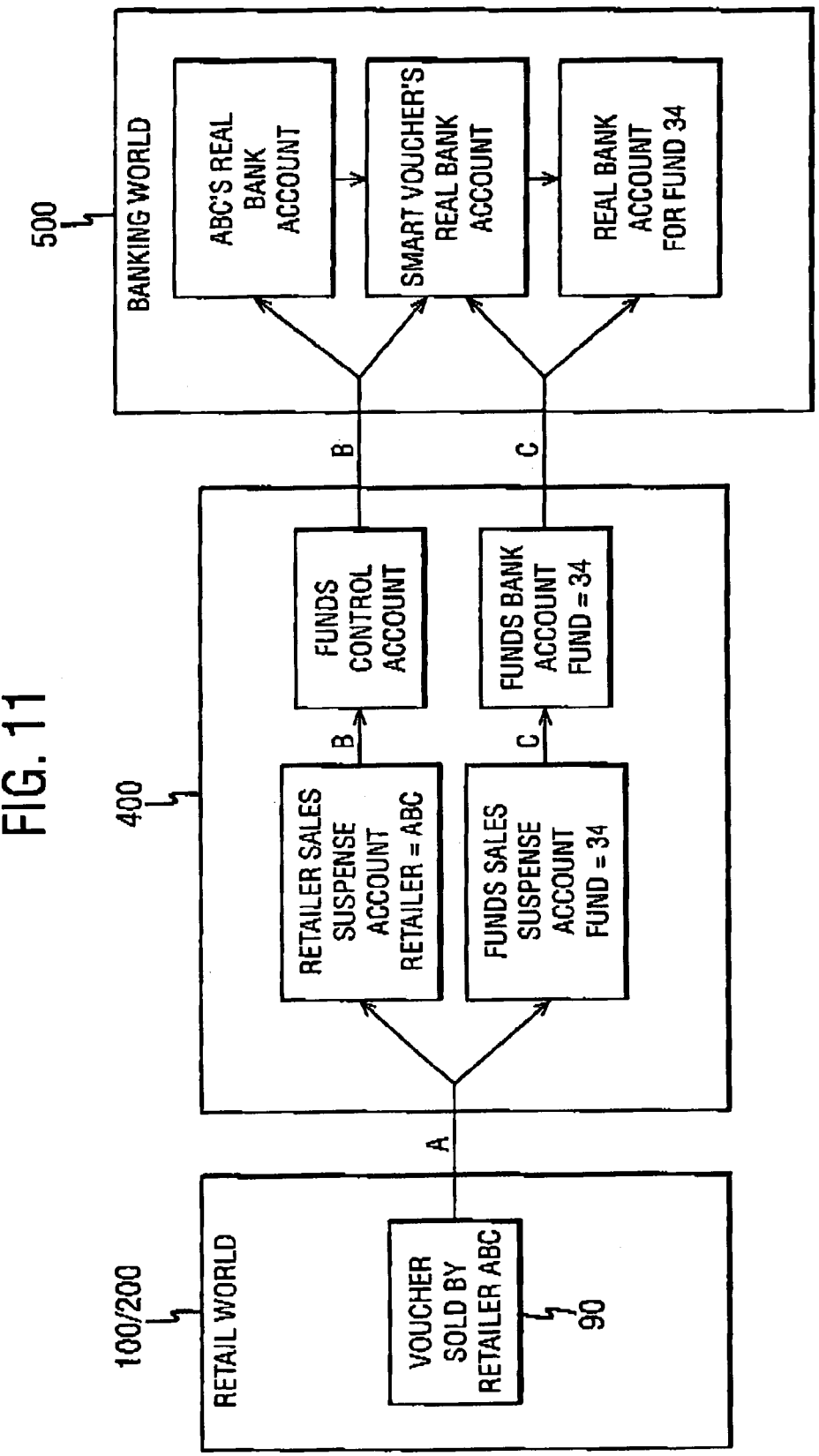
FIG. 11 is a block diagram indicating the relationships between the retailers, the core system and actual banking accounts.

FIG. 11 shows the relationship between the retail world of functional layers 100 and 200, the core system of layer 400 and actual bank accounts shown in a functional layer 500. It is assumed that at 90 a cash voucher is sold by retailer ABC. As a result of the sale the tables 22 and 23 of the main database 19 are updated along with the generation of the coded number and an appropriate entry into the voucher table 20. As will be apparent at this time no physical transfer of funds is required. Thus at step A the suspense accounts of the core system are updated at the time that the voucher is sold. No funds are physically transferred. Step B shows end of day transfers—retailer sales. Balance of each retailer sales suspense account transferred to the overall funds control account. Instructions are given via the interbank clearing system to transfer that amount from the retailer's bank account to the system operator's bank account. Step C shows end of day transfers—fund sales. The balance of each fund sales suspense account transferred to the funds bank account. Instructions are given via the interbank clearing system to transfer that amount from the systems operator's bank account to the fund's bank account.

An important feature of the system is that the system as described only records values and not currencies. It is currency independent. By adding a nominal currency field to the VIN table, 24, it is possible to assign a currency to each product so that 3 products could be processed within the one database each with a different currency e.g. GBP, USD and a private currency such as cleaning token units; the associated currency not being material to the processing or calculations.

Having now given a description of the general system and how it operates some fundamental features will now be apparent.

In particular when a purchaser obtains a cash voucher using one of the procedures which have been described the funds provided by the purchaser will be transferred into the funds account of the system but only in the form of a balance representing redemption value of the voucher. Vouchers are not individually listed and there will simply be an amount held in the fund account which is in total exactly the redemption values of all live (unredeemed) vouchers associated by their product table with that particular fund.

In a similar manner each voucher exists entirely independently of its purchaser. It is thus readily transferable to another person. In particular a voucher can be transferred with great simplicity over the Internet or verbally over the telephone as the recipient does not need to be linked in any way to the overall system.

Another feature of the system just described is that both the purchase and the redemption of a voucher can be carried out with minimal change to the normal terminal already present at a retailer location or used for Internet trading. Additionally a person presenting a voucher for redemption over the Internet can purchase goods without the need for supplying credit/debit card details.

One particular advantageous capability of the processor system is that it is capable of the bulk issue of vouchers. Several of the processor system features required for this have already been briefly described. Rather than create individual vouchers in response to individual requests from a retailer's POS terminal or internet site the creation of a bulk file of numbers is initiated centrally by the system manager using the central user/system operator application 18 and, within the core system 1, the holding facility previously described. This action would be initiated in response to a request from a scheme (or Product) Owner normally received via interface section 15. All vouchers in a bulk issue must be for the same product and have the same value. The manager specifies the Product (IIN+VIN), the voucher type (normal bulk issue or magnetic card) the common value, valid from date (see below) and expiry date and the number of vouchers required. The system, on receiving the request, stores this common critical data in the holding facility and starts a looping process that uses the standard voucher creation process to create a voucher of the specified product type, value and other common parameters, stores it in the holding area HA and then keeps repeating the action until the required number of vouchers has been created. All the unique voucher numbers generated by this looping process are given the 'voucher type' of 'bulk issue' (FIG. 7) and are collected in the holding storage area HA until the required volume has been created when they are written to an electronic file that can then be transmitted to the scheme Owner for them to use as they wish via the interface section 15.

A feature of this embodiment is that the vouchers can be created in uniquely numbered batches and have a 'valid from' date. This information is stored in the batch table 30 (which stores all vouchers by their associated batch number for ease of future reference) and the voucher table 20 respectively of the main database 19. The data held in batch table 30 is shown in the table of FIG. 12. Until this 'valid from' date is reached the voucher can not be used. This is achieved by including an extra step within the Redemption Request Validation step S25 of FIG. 9. In this the process also checks for an associated 'valid from date' and, if found and it has not been reached, it rejects the transaction. This extra functionality enables the Product Owner to e.g. print their own vouchers in quality format using the voucher numbers from the electronic file provided and distribute them to the points of issue without risk or the need for secure control because, if anyone attempts to cash a voucher prior to the 'valid from' date the transaction will be rejected. Also, if a batch is lost, it can be cancelled centrally by reference to its unique batch number. This would be achieved by the system manager using the central user/system operator application 18 and, within the core system 1, the system using table 30 to identify all vouchers associated with the specified batch number and setting the status of each to 'compromised'. Whatever the date of an attempted redemption, payment will not be authorized against a voucher with this status. These abilities to automatically block their use prior to a specified date or to centrally and quickly cancel a whole block of printed gift vouchers are not possible with any other current known system.

FIG. 12 of the accompanying drawings shows the data held in batch table 30.

In another embodiment the flexibility of the system is enhanced by enabling the message formats of FIG. 6 to be available at a retailer's POS terminal to be used dependent upon voucher type and customer's request. The data is transmitted and is packaged into a consistent standard ISO 8583 format for ease of transfer through the Interbank card product communication systems.

The message format C enables the issue of a change voucher upon the fulfillment of certain requirements. These are that a voucher has been previously redeemed and its number is included in the request message, that the new voucher value requested is less than the one just redeemed and that the request is for the same product type (VIN). With such a voucher type purchase the core system records against the new voucher number (in table 20) the linked redeemed voucher number. Using this facility the history of use of a voucher as it is decremented by purchases can be recreated into a 'statement' if required. This is not possible with any other current voucher based system.

For each voucher on the database of the core system 1 the information shown in FIG. 7 is held in appropriate registers of the data base of the core system.

These data fields represent the minimum data necessary and additional data can be added in accordance with users' requirements.

The issue and use of a standard cash voucher without the additional message formats is described in detail earlier in the Patent Application. Making a purchase at a retailer's POS terminal the assistant would select Message Format PV, specify the Product required (typically held within the POS terminal as one of a limited range of options for that terminal), and the value. Within the System Core, following various security checks on the authenticity of the incoming message, on receipt of the message a voucher number would be created and written to the master table, the status set to 'Issued' and other information such as value, time and place of issue written to the master table within the voucher record (FIG. 20). The sales assistant's POS terminal would print the voucher for the customer using the content of the response message.

To redeem the voucher the assistant would select Message Format RV, input the voucher number and its value and transmit. Within the System Core, following various security checks on the authenticity of the incoming message, the voucher details would be located on the master database, the value checked, the date checked to ensure the voucher was still current and the voucher status checked to ensure it was still 'Issued'. Also, if the voucher type was 'bulk issue' the valid from date would be checked. If any of these checks fail then a 'Fail' response would go back to the retailer's POS terminal, otherwise a 'Success' response is issued and the status altered to 'Redeemed' on the central voucher record, table 20. Time and terminal ID for redemption are recorded.

If the user requires a Change voucher then a Message Format C is requested for the amount of the Change voucher and the PV step above repeated except that, additionally, the message from the retailer will include the number of the voucher just redeemed (N), the System Core will check that this number voucher has been redeemed and will record the number N in the Linked Voucher Number field of the new voucher issued.

Alternatively the retailer's assistant could simplify the process of RV+C by specifying Message Format PS which would have the same result on the central core system, including the recording of the number N in the Linked Voucher Number field of the new voucher issued, but require the retailer to only submit one message request from its systems.

A further capability provided by the core system as described is concerned with the issue of electronic Gift Cards which is a product growing in popularity in the retail market. Normally the card is plastic and carries a magnetic stripe on which is recorded a unique number linked to a record on a central database accessed via a retailer's POS terminal. The unique number may, however, be alternatively held as a bar code on the card or recorded in the memory of an IC chip located on the card or as the SIM card of a mobile phone. In the current systems the number is associated with a current value and as and when the Gift Card is used this centrally held value is updated to add or reduce value.

This further embodiment enables the issue and operation of a Gift Card type product with significant improvements over the current state of the art. The basic procedure is the same as the bulk generation of voucher numbers.

Figure 13:
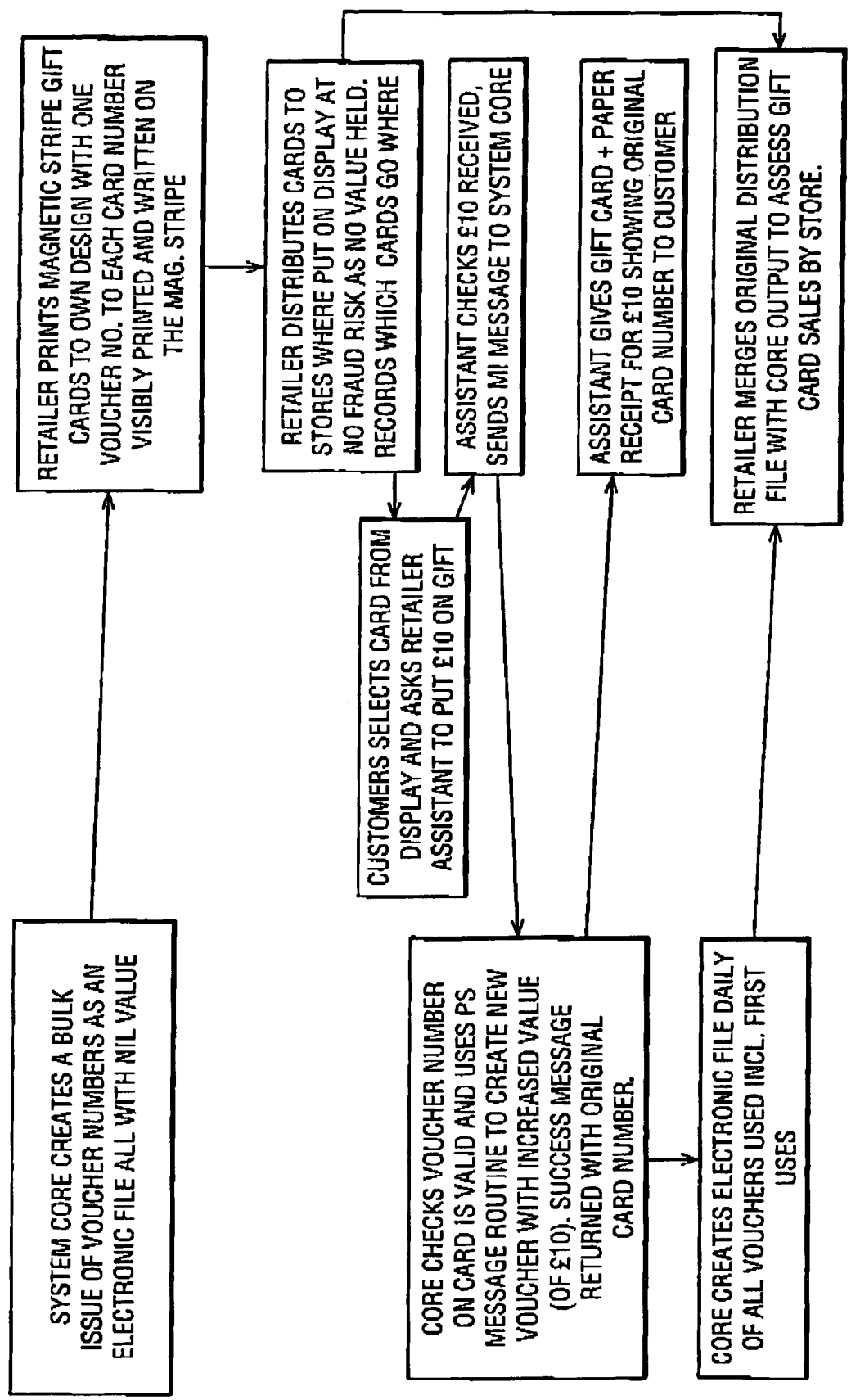
FIG. 13 is a flow diagram illustrating a process which can be carried out by the enhanced processor system.

The process to be used for initial issue is shown in FIG. 13. In this, in response to an order from the Gift Card scheme owner, the system manager uses the central user function, 18 to place a bulk order as described for the required volume of voucher numbers for magnetic card type vouchers. As before this initiates a looping process involving the already described holding area. Each iteration of the loop is as follows. Because the request is for a magnetic card type voucher the core system in addition to the bulk voucher process described previously creates a first standard number—the account number—which is given a 'magnetic card' type in table 7 and stored in the accounts table 31 of the main database 19 as an 'account number' as well as being stored, as normal, in the primary voucher table 20. FIG. 14 of the drawings shows the data held in the Accounts table 31, and FIG. 15 shows transaction flows when an account is managed by the core system. This first process also stores this same number in a second field associated with the 'account number': the 'current associated live voucher number' (CALVN). In the same process the Account/voucher number's initial value (which will be NIL) and expiry date will be stored in the fields 'current associated value' (CAV) and 'current associated expiry date' (CAED). Placing the Account number in table 20 ensures it is not duplicated subsequently. Once the initial Account creation looping process is completed the holding area creates an electronic file of all the account numbers and this file is passed to the Gift Card scheme owner. The Gift Card scheme owner next writes each account number to the magnetic stripe of a series of plastic gift cards of their preferred design and places these on display in stores. Since each card carries no value there is no risk associated with this. Also the use of a magnetic stripe is described here only by way of an example since, alternatively, the number could be stored in the memory of a data chip held on the card or printed as a bar code—the important fact is that it should be possible for the retailer's accepting POS equipment to be able to read the account number on the card. For the customer's convenience the account number may also be visibly printed on the card. When a customer chooses a gift card they then pay the selling retailer the value they wish to place on the card and the retailer captures the account number with their POS equipment and sends an MI message (FIG. 6) via the interbank system (or direct if preferred) to the core system interface 16. This message includes the account number and the initial value to be added. The communications interface reacts to the MI message identifier by referring to the look-up table 31 to find out the current live voucher number associated with the received account number (which on the first transaction only will be the original Account card number); replaces the account number in the message with the CALVN and then initiates a top-up type process (akin to PS) through the core system using the CALVN. The value in this message for the existing voucher will be taken from Table 31 (CAV) and the required value of the new voucher will be the sum of the existing associated value (CAV), from Table 31, and the required addition, from the incoming message. The output is a new voucher number with the associated value of the initial purchase. On receipt of this output the communications interface, 16, again refers to the look up table 31, replaces the previous CALVN with the new number just issued and substitutes the account number into the return message in place of the valid voucher number. It also replaces the CAV and CAED in Table 31 with the corresponding values for the new voucher. The retailer's POS terminal receives a 'success' response and prints a terminal slip quoting the Gift Card account number, the initial loaded value and the expiry date that was included in the response message. Nothing is written to the Gift Card magnetic stripe. The retailer gives the Gift Card and transaction slip, in a presentation pack if preferred, to the customer who can pass them on to the intended recipient.

Figure 16:
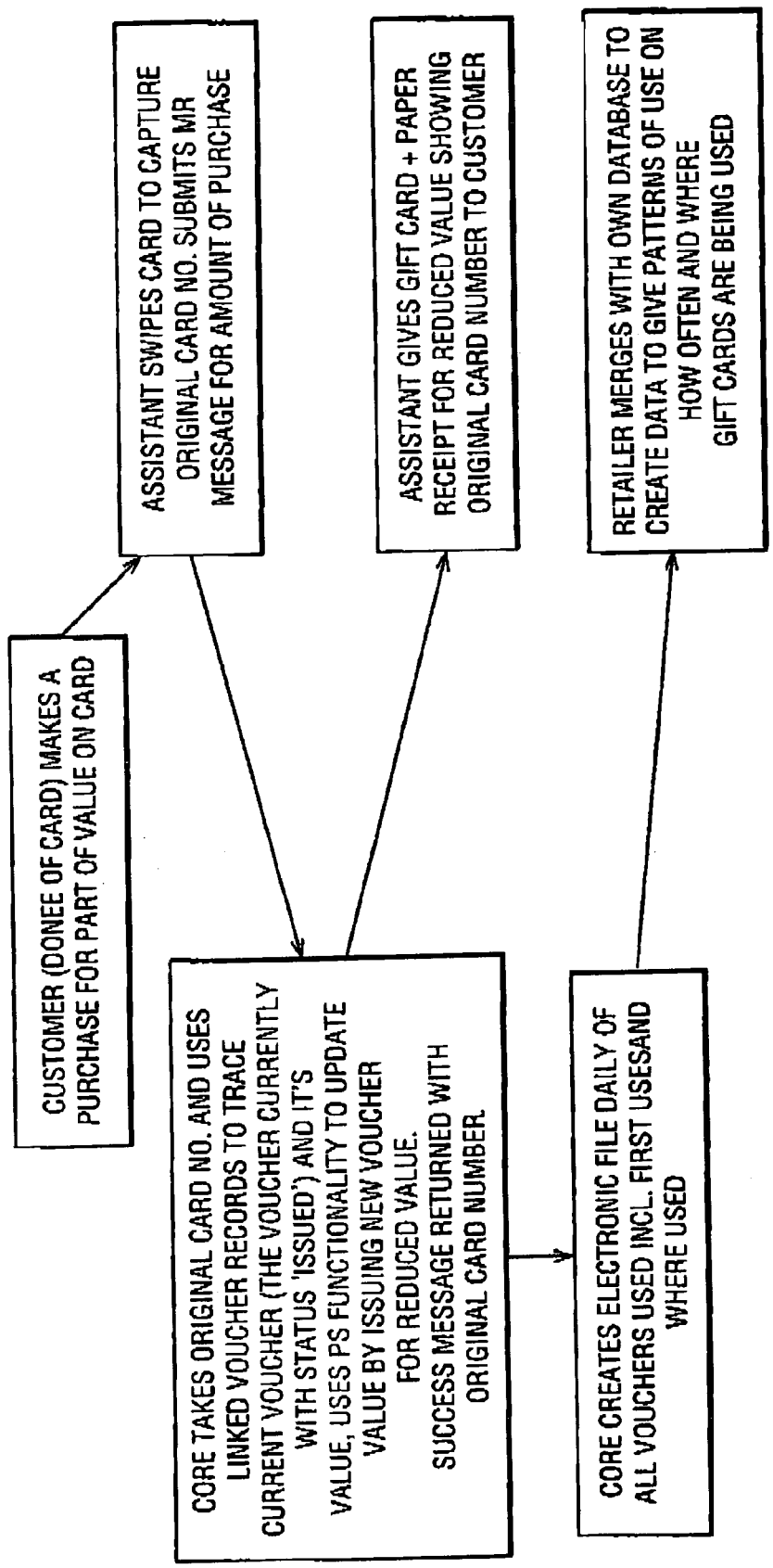
FIG. 16 is a flow diagram illustrating a second process.

Once the card has been issued and a value has been allocated to it FIG. 16 shows the steps to be followed when the card is used. The retailer uses their POS terminal to capture the account number and selects message format MR (=reduce) (FIG. 6) if the customer wants to spend money from the card or MI (=increase) if the customer wishes to add more money to the card. As above, receipt by the communications interface 16 of an Mx message format will cause it to refer to table 31 to identify the current live voucher assigned to the received account number, substitute that live voucher number for the account number in the message and submit the message to the core system for either a replacement reduced value or increased value voucher as appropriate. On receipt of the output the communications interface 16 will substitute the new valid voucher number for the old along with the new CAV and CAED in table 31 and replace the voucher number in the message with the fixed account number before sending the return message back to the retailer's POS terminal as a success. On receipt the POS terminal will print an advice slip as before and the retailer will return the Gift Card to the customer with the advice slip showing the new balance on the card and the revised expiry date.

If the customer should try to spend more money in an MR transaction than the value of the current assigned valid voucher then the transaction will fail. To reduce this risk the customer can find out the balance by sending in an MB enquiry (FIG. 6) associated with the Gift Card account number from the POS terminal. On receiving this message format the communications interface 16 will identify the current assigned valid voucher from table 31 and look up its associated value and expiry date on table 31 all 3 items of which are returned to the POS terminal in the standard message format for printing and giving to the customer.

FIG. 15 shows the flow of transaction during this procedure.

It will be appreciated that the Gift Card account number will never itself be used within the core system except on first use and subsequently as a reference number. As the card is used the core system will generate a sequence of temporarily valid voucher numbers, assigned to the account number via table 31, representing either the decremented value following a purchase, or an incremented value if the card is topped-up.

The account number on the card will merely act within the core system as a pointer to the most recent valid voucher number which has been generated. The use of one of the message codes MI, MR or MB will instruct the core system to go beyond its standard practice of checking details for the voucher number of the incoming message and use the system of linked voucher numbers to trace the one voucher in the chain that currently has the status of "Issued". Thus use of each card will generate an audit trail which if required can be accessed at a later date similar to that described above for change vouchers.

To the card holder this system exactly replicates the current electronic Gift Card system using a magnetic stripe card. The Advantages of using the system design described here over existing implementations of this concept are:

1. the use of separate linked vouchers for each stage in the gift voucher's 'life' means that at any time a history of transactions before and after any particular transaction or for a particular card can be easily created for the card user using the 'linked voucher number' field in table 20 (FIG. 7).
2. potentially from item 1 a replacement scheme in case of loss could be defined.
3. a retailer can create patterns of use by time and location for statistical analysis (by analysis of the voucher data of when and where each voucher of that product type was issued and redeemed)
4. the card need not be present to make a purchase and provided the original card number is known and transmitted the gift can be gifted by internet or mobile phone A development of the Gift Card process above will now be described.

There already exists a service in which employees are given vouchers to clean their uniforms, say one voucher per week, and the vouchers are accepted at a variety of different cleaning outlets, possibly at different prices per uniform to the promoter. The issue and management of vouchers, currently done using paper vouchers, is administratively slow and expensive.

By using the gift card format above linked to further refinements a much simpler process can be implemented. Each employee would be given a gift card with a known account number and preloaded with a value with each unit representing one clean. In this case the financial aspects of the Core System are used, not to record actual monetary value, but single units i.e. 1 unit=1 uniform clean. As previously stated the core system is currency independent but could easily be adapted to record for information only the currency being applied to any particular VIN/Product. The employer would keep a record of which employee had which account card. By adding a simple additional process to the core system an instruction could be received by the Core System to add, say, 4 units to the value of each card listed on the input file every 4 weeks. Similarly a card could be blocked immediately an employee left the service of the employer and the value returned to the employer. These would be effected using electronic files received from the employer/scheme promoter. On receiving (e.g. at the 4 weekly update) a file from the employer to add a value (this could be variable but must be specified by account card) to each account the system operator using the central user functionality, 18, would initiate the new repetitive process that would take each account number on the presented file and perform the MI initiated process within the core system for that account card thereby increasing the value by the number of units specified in the employer's input file. This process would allow the employee to carry forward any unused units to the new cleaning period. If the employer did not wish this to happen but wished for each employer to forfeit any unused 'cleaning credits' a further prior process could be implemented in which the MB balance enquiry function was run iteratively for each account card on the employer's list and an electronic file of account card balances drawn off the core system. This could then be merged with the required input file outside the core system e.g. using a suitable known program such as Excel, in which the current balances are deducted from the required input values account card by account card. A revised input file would then be created consisting of the new decremented amounts to be input by the system operator as described previously. The combined effect of the two operations will be to ensure all account cards on the employer's input list start the new period with the number of 'cleaning credits' the employer specified in his required input file.

To cancel an account card the system operator would simply identify the current valid voucher number associated with that account card and set its status to 'compromised'. Since the MI and MR processes will only work on replacing existing voucher numbers with status 'issued' changing the status will cause either process to fail if attempted.

All cleaning companies so authorized to clean uniforms would be authorized to accept the cleaning account cards (gift cards that would be decremented by 1 unit for each uniform cleaned or however agreed between the employer and the cleaning company). This process would happen in the same way that a Gift Card would be used at a POS terminal to buy an item with value 1 currency unit. The core system would produce weekly reports on how many units had been used and with which cleaners enabling the employer to pay the cleaning companies (at different rates per cleaning unit for each company if appropriate) with ease. These reports would be created using existing known reporting systems operating on the data stored in the various data tables of the main System database, 19. The new system can be seen to be much better than the existing one since there is no need to manage the distribution of physical vouchers, there is no need for cleaning companies to repatriate paper tokens in order to be paid, the tokens of leavers are easily cancelled and employers save on any related fraud as only vouchers issued by the employer can be spent.

A further capability provided by the central processor is as a money transfer mechanism that does not require the use of banks. Whilst Western Union and Moneygram also provide such services with some features that are common to the invention, e.g. the use of a number; differences of method and process design differentiate the current invention as being significantly simpler and cheaper to operate.

Patent GB2364816 provides for the issue and redemption of an electronic cash voucher which can be gifted by a variety of methods between initial purchaser and donee, including electronic delivery. It also demonstrates how a retailer has the ability to print the essential information of number, value and expiry date onto a paper or card voucher to whatever way and design they choose to match their corporate image e.g. to replicate the well known store paper gift vouchers currently in issue. This is the 'Gift Voucher' of the original concept.

Such a gift voucher is commonly used by the donee to buy goods at the store(s) specified on the voucher. When, however, the constraints of the core system for a specified VIN/Product are configured within table 29 of the main system database, 19 or within the accepting retailer's own systems (layer 100/200 of FIG. 1) to only issue cash against the voucher a simple money transfer system is created. For example, a parent may wish to transfer £200 to their student child in an emergency. By purchasing a 'money transfer voucher' product from a convenient store (or its internet site) of the sponsoring retailer and phoning/e-mailing, etc. the relevant voucher number and value to their child the child is then able to go into a store of the sponsoring retailer local to them and exchange the voucher for cash at any suitably enabled POS terminal. If the retailer chooses to use a direct connection to the core system communications interface 16 for its cash voucher transactions then no banks have been involved in this transfer of funds across the country. Some countries have legislation protecting against Money Laundering that is relevant to such money transfers but typically these exclude low value transactions where no suspicions are raised. The feature of the current invention whereby a maximum limit can be applied to any transaction (cash voucher issued) assists the retailer to work within such legal constraints.

Current communications technology is such that a database can be quickly and cheaply accessed from anywhere in the world. A money transfer voucher for a sterling amount recorded on a system database operating in the UK can thus be easily bought in another country (say the USA) using e.g. a POS terminal or PC, provided it has a direct connect link to the core system communications interface 16. The methodology of voucher purchase is exactly the same as previously described with one additional step which is outside the scope of the invention and uses commonly existing systems. Payment for the voucher purchase will be made in local currency the conversion of which will be handled by the retailer/foreign exchange business providing the purchase service to the customer. Having purchased the sterling voucher in the USA the customer can then send the details by phone, e-mail, text, etc. to the intended recipient in the UK. As before, the recipient can take the voucher details into any store participating in the scheme and exchange it for the sterling value of the voucher. All this could easily be done within 10 minutes. A simple, quick and cheap international money transfer system has thus been created. Again, this does not require the involvement of banks, except where the retailer that initiates the transaction and carries out the currency exchange conversion needs to pay their local currency into a bank account and make payments in bulk to the scheme operator for the sterling denominated vouchers sold.

A further embodiment of the invention enables the tracking of Customer Activity in response to a Direct Marketing Initiative.

The processing system described is used as an aid to retailers to track customer behavior/responsiveness to different direct promotions. The retailer issues by direct (e-)mail to customers on their database (about whom they already hold demographic information) a variety of different promotions (possibly at different times) represented by individual Voucher numbers. By tracking which vouchers are cashed together with when and where, by using the Core System and marrying with their own Customer Relationship Management data, the retailer can analyze what works best with each customer segment.

No extra system functionality is required to achieve the above. The system manager, using the central user functionality 18 will arrange for a bulk issue of standard voucher numbers for a particular VIN/product to be created and the file sent to the requesting retailer. If several promotions were to be tested then it would assist later analysis if a bulk file of voucher numbers was created for each promotion and each with a different VIN/product number. The retailer will then assign each voucher number to a different customer and send his promotion to the customers recording who is sent what. Issue may be by post, e-mail, text message, etc. These vouchers may have a value which the recipient redeems against the cost of the service/product bought from the retailer or they may have a Nil value and are simply redeemed in exchange for the incentive on offer. In the latter case no financial entries are passed but the process of redeeming the voucher records on the database 19 where and when the incentive offer was taken up. At suitable frequencies agreed with the retailer the system manager will create an (electronic) report by voucher number of where and when redeemed (using standard known methods on the database 19) which the retailer can merge with his record of which voucher was sent to which customer and their associated profile to analyze for patterns of take up.

In a variant of the above using the invention a series of products would be designed (possibly all the same) but each with a different VIN/product code. A different 3 digit product code would be assigned to each newspaper and printed therein. When a customer entered a retailer to take part in the promotion they would have to quote the 3 digit code and this would be used with a PV message request to obtain a 'cash voucher' that may have Nil value. At the simplest level the retailer could give the customer the benefit of the promotion without further reference to the Core System (the success response with a voucher number being ignored). The data on the Core system database 19 will then be analysed to produce a report daily/weekly (as required) to the Promoter of the volume of each product type issued i.e. the number of claims generated by each newspaper together with the when and where for the claims being made (this would identify changes in take up patterns by region of the country). Delivery of such information would be quick and cheap and easily administered relative to currently available methods.

A further refinement of the above proposal would be to e.g. provide a service to a shopping mall. In this example a shopping mall (=retailer1) would put a standard promotion in a variety of newspapers telling those taking up the offer to go to the mall information desk to obtain their gift voucher. This would work as per the simple format described above giving the mall management valuable information on which papers were effective at promoting the mall. However when the customer claimed their promotion from the information desk the system would use the response message to print a 'cash voucher' with a value that could be redeemed at any of the retailers operating within the mall. Again by interrogating and sorting the data in the main system database 19 the system would then readily provide reports of valuable information on how many vouchers once claimed, were actually used and the spread of use across the stores in the mall.

The system just described has great flexibility—for example with minor changes the system can also handle the control of interest bearing savings club vouchers. In operation a customer buys a voucher from a Savings Club before a certain date that cannot be cashed until after another date. On the second date the voucher is increased in value by a sum of interest and the customer can then redeem the voucher at specified retailers.

As an example it can be assumed that the Savings Club is a Christmas Club with vouchers for fixed amounts, say £10 to £100 in £10 increments, available from January through October for redemption from 1 December. A January voucher earns interest for the months of February through November i.e. for 10 months. Suppose the interest rate payable is 6%.

In operation of the system a member would create a series of Products, one for each month of issue and print vouchers in bulk for delivery to issue outlets (although a retailer system could deliver electronically from file—i.e. no reference to the core system at time of sale—into store or via web site). Since these vouchers are issued in bulk a start date of 1 December can be set after which the vouchers become valid and can be cashed. Each January voucher with a face value of £100 would have a value on the SV core of £105 (£100+interest). On a monthly basis unused voucher numbers could be returned to SV for cancellation as the previous month's product could no longer be issued. This solution does not provide a method of managing the funds collected from the sale of the Savings vouchers so this would have to be done by the retailer that owned the products/managed the scheme. Also it does not provide a solution for early redemptions. These would have to be managed by the retailer who would then ask the system operator to arrange through the central user functionality 18 to cancel (i.e. reset the status to 'redeemed') the voucher before it became live. This process is also weak because it does not give control of unissued vouchers.

An improved embodiment requires development of an Issue Start date for standard, i.e. not bulk, issue vouchers. This information could then be recorded in the 'valid from date' of table 20. The enhanced process would be to set up the Products for issue on request from a retailer at the face value and have the new Issue start date configured for 1 December. The holder would then be required either in a store or via the internet to contact the system core on or after 1 December to have their original voucher redeemed and replaced with one with the interest earned added. This process would use the PS message format. The new voucher could then be redeemed in the normal way. This solution could manage all funding entries but requires a method for calculating the interest to be added and associated tax accounting, possibly by use of an internal Product look up table or by real-time calculation on receipt of the request either at the retailer or possibly using a feed from a partner already licensed to do this. This approach overcomes most of the stated limitations of the 'simplest solution' above.

Figure 17:
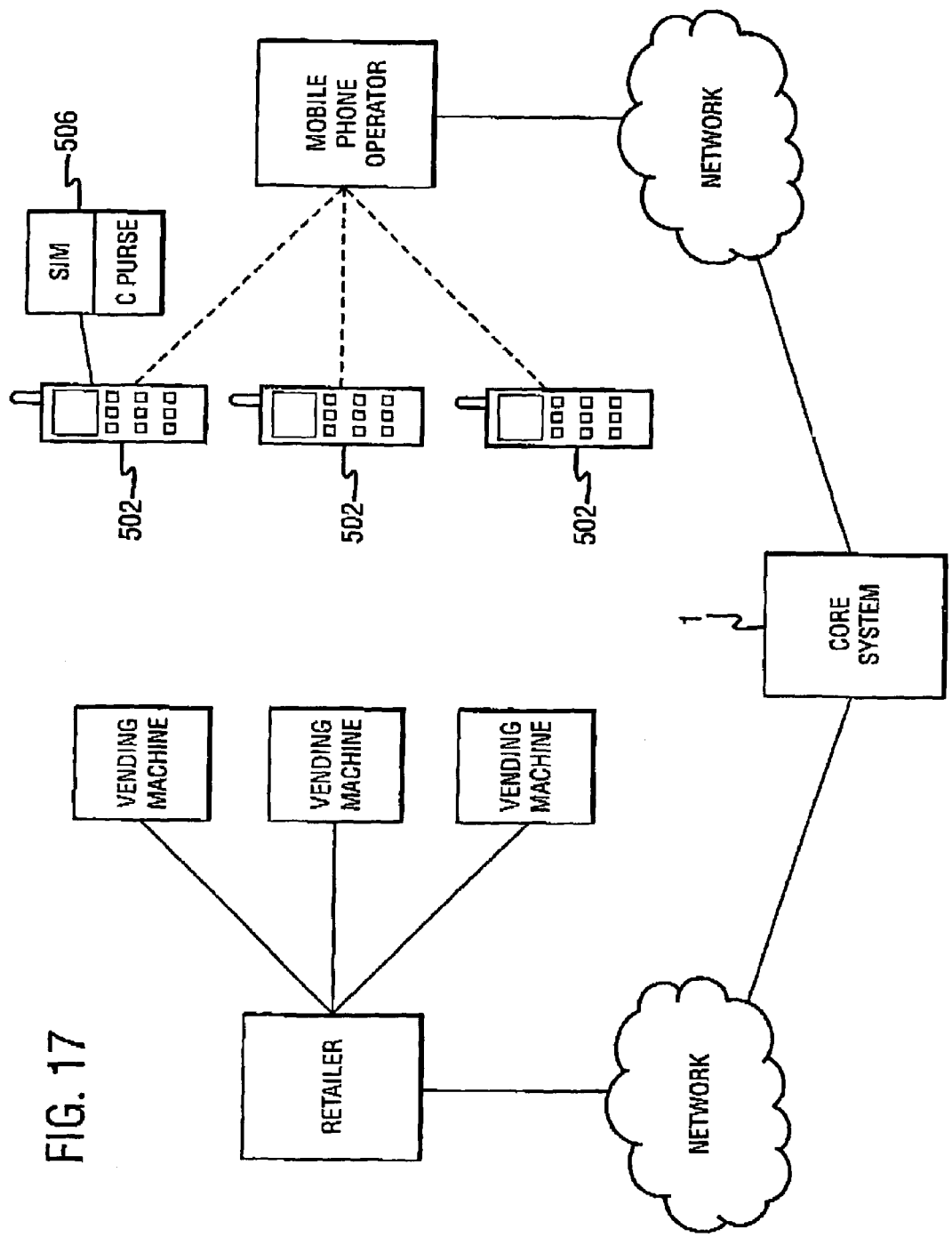
FIG. 17 is a diagram of the system when associated with a mobile network operator.

Referring now to FIG. 17 of the accompanying drawings, this shows the core system 1 which has already been described. The core system 1 is connected to Retailer A by a network 500. The retailer has a number of unattended vending terminals 501. Also shown are mobile phones 502 served by a mobile network operator 503 which in turn is connected to the core system 1 via the already described interface 2.

Each mobile phone 502 has a SIM card, on which is stored in RAM 506 a cash voucher number and routines which enable the user of the phone to buy goods from the terminals 501 and to replenish credit available to the user to make phone calls. Thus the presence of the SIM card enables the mobile phone user to interact with the core system 1 via the network operator 503.

If the user wishes to purchase goods at the unmanned terminal 502 the user selects the goods at the terminal which will display their cost and an option to pay using a cash voucher. The user transfers the cash voucher number and its associated value from their phone to the terminal using a suitable known method. This could, for example, be done by manually keying in the detail on the terminal's keypad' displaying the information as a bar code on the screen of the phone to be read by a reader on the terminal or by electronic transfer by means similar to that used with contactless secure building entry cards. The unmanned terminal would check the value was no less than the cost of the goods and transmit a PS message via the retailer to the core system.

At a high level the core system then processes the request to exchange the voucher on the SIM card for a new one with a value less than the original by the amount of the purchase. This would use the Message format 'PS' listed in FIG. 6 and described in more detail later on as a 'top down'. If the transaction is authorized by the core system then the unmanned terminal would receive a 'success' response and would display the replacement voucher details to the user for manual capture or otherwise transfer them back onto the mobile phone SIM card and release the selected goods to the purchaser. At, for example, the end of each day the processing routine in the core system 1 will credit the unattended terminal retailer owner with the total of the relevant amounts of purchases and debit that same total to the funds account for the VIN associated with the telecommunication company. Conversely the customer may wish to increase the value of the voucher held on their phone. This is done using a standard routine embedded on the telephone which originated a 'PS' type 'top up' message that communicated via the telecommunication company, probably using an SMS text type message, with the core system to obtain a voucher with a value greater than the one currently stored on the phone by the value of the top up purchase. Again, for example, at the end of the day the processing routine in the core system 1 will debit the telecommunication company's account with the total of all the day's top ups and add this sum to the value held in an associated fund account for that VIN. It then remains for the telecommunication company to bill their customer for the top up to the voucher on the mobile phone, the detail of which transaction they will hold in their proprietary billing system.

An enhancement of the above process would be to use the Account card functionality previously described and the associated message formats MR, MI and MB. The advantage of this approach for phone operators is that only one 'voucher number' i.e. the account number, would ever be used for each phone and this could simplify programming and storage on the phone itself and in the initial download of the service application onto a new user's existing phone.

It will be appreciated that current practices require telecommunication companies to use mobile phones with chip cards built to EMV standards to allow transactions into the banking network for payment either for phone top-ups or for payment for goods. This will be both expensive and slow to implement. In one variant of the system there is direct connections between the core system to a telecommunications company without the need to include the retail banking system. This system has flexibility in that the message format could be decided by the telecommunications company provided it contained all the key data required by the core system and in particular for the interface of the core system to write the message map to and from the core system. Additionally the existing text format of SMS messaging supports 156 characters which are more than adequate for the requirements of this system.

An additional advantage is that all the activity is automated and if the messages do not use the banking system they do not need to perform to ISO 8583 so that voucher numbers and terminal IDs could be alphanumeric and longer than 19 digits. This greatly increases the potential volume of numbers on a single product/VIN code from $10^9$ to $36^9$ as well similarly increasing the number of VINs.

Such a system may not be economic for very low value purchases. To overcome this the chip on the phone SIM in this embodiment holds an electronic purse with a relatively low limit which is decremented for all low value purchases without the need to refer each such purchase via the telecommunications company to the core system 1. Appropriate routines would top up this value by a similar process to that already described when the value in the purse had been decremented below a specified lower limit. It will of course be necessary to provide a suitable security system for this electronic purse function on the phone using a known method outside the scope of this invention.

In addition to the particular advantages of simplicity of operation and use of already existing facilities such as the Interbank Communication System the system particularly described hereinbefore provides a very significant technical advantage with regard to the amount of processing which has to be carried out and the need to allocate substantial volumes of memory for data storage.

It is believed that the system described has applications in many fields in which money has to be transferred and if it is successful the number of transactions to be handled by the system will be extremely large. Thus the feature that vouchers are not allocated to individuals and that the funds supporting live vouchers are not subdivided to reflect individual vouchers values give a consequent reduction in the amount of processing to be carried out and in the usage of memory space.

The system just described also has a high degree of security as a cash voucher cannot be used unless funds have been committed with the request. Thus a voucher cannot be redeemed unless the funds have been committed to the operator of the system. Additionally the manner in which a coded voucher number contains the constraints which define it as a product means that the table holding the unredeemed vouchers will indirectly represent an accurately defined cash value which will be shadowed in the Fund Ledger Table 22 of FIG. 4 and which will have a counterpart cash balance in an actual bank account. Thus any change to increase or decrease the live vouchers in the voucher table 20 must be mirrored in the Fund Ledger Table 22 and on the actual bank account.

The invention claimed is:

1. An electronic processor system for use in processing cash transactions and comprising an electronic processor and a database, the processor comprising:
   a processor for receiving requests in the form of messages in a plurality of different formats from members using the system and for transmitting response messages in response to received request messages;
   a memory device for storing a plurality of message formats, the message formats including a first message format defining a message requesting the generation of a coded number representing a desired cash value to be purchased at a terminal, a second format defining a message that a previously generated number may be redeemed, and a third message format defining a single message requesting the generation of a plurality of coded numbers;
   a unit for determining the format of a received message by reference to the stored message format table;
   a validation unit for determining whether or not a received message of any one of said three formats is valid;
   a holding area for storing messages which have been validated;
   a first storage unit for storing in the holding area a valid message for the generation of a plurality of coded numbers in a batch; and
   a number generation section for generating a single coded number in response to a valid request for a single number and to generate as a batch a plurality of coded numbers in response to a request of the third format, each coded number including a random multi-bit identification number, and to generate a response for transmission to said interface if a received message of the second format is determined to be valid;
   said database further comprising storage sections which include said holding area and a plurality of sections for storing in response to instructions received from said processor, each number generated in response to a valid request for a single number and every number generated in response to a valid request for the generation of a plurality of numbers and for storing the total value of cash represented by issued coded numbers which have not been redeemed in a fund table, said processor in operation decrementing the total value of the fund table by the value represented by each coded number for which a validated redemption request is received and incrementing the total value of the fund table by the value represented by a newly-issued coded number.

2. A system according to claim 1, further comprising:
   an input unit whereby there can be entered a single request for the generation of a batch comprising a plurality of different coded numbers of the same value;
   a second storage means for storing in said holding area said request; and
   means responsive to said stored request to cause the number generation section to generate the required plurality of coded numbers in an iterative loop and to store the generated numbers, each of which has a different random multi-bit identification number, in an electronic file in the database.

3. A system according to claim 2, wherein in response to a request the processor is adapted to generate a first batch of coded numbers of nil value and a second batch of coded numbers also of nil value each associated with one of said first batch of coded numbers, and wherein said processor is adapted to generate an electronic file of said first batch of coded numbers for transmission to a retailer.

4. A system according to claim 2 including an operator interface whereby an operator of the system can enter a request for the generation of a plurality of coded numbers.

5. A system according to claim 2 including means for allocating a batch number to a plurality of coded numbers generated in response to an operator interface request, and wherein said database includes a batch table for storing all vouchers in batches by their associated batch numbers.

6. A system according to claim 5 including a unit for invalidating simultaneously all coded numbers associated with a batch number.

7. A system according to claim 2, including means for associating with each coded number in a batch with a valid-from date, and wherein the validation section is adapted to check a redemption request received from a terminal with respect to a number in the batch and with respect to this valid-from date before allowing redemption of the coded number.

8. A system according to claim 2, wherein each coded number of the batch so generated includes a set of digits which form part of the number and which define constraints set on the redemption of the number, the coded numbers all including the same set of digits.

9. A system according to claim 1, comprising a plurality of terminals each associated with a member organization for generating message requests and forwarding the message requests to the interface.

10. A system according to claim 1, wherein one message format represents a linked transaction in which the message format indicates that a coded number of a particular value is to be replaced by the number generation section with a coded number of a different value, and wherein said interface is adapted to forward such a linked transaction message to the holding area, and said processor is adapted to decrement the fund table in respect of the value of the coded number, to generate a new coded number representing the requested different value, to increment the fund table with the value of the new coded number and to cause the interface to send the new coded number to the terminal from which the request was received.

11. A system according to claim 10 in combination with a plurality of mobile phones, each mobile phone including a SIM card and having a memory storing a coded number issued by the system and a routine whereby users of the mobile phones can text the mobile network operator associated with the mobile phones so that the mobile phone operator can contact the system with a message of the linked message format whereby the coded number stored in the mobile phone can be replaced with another coded number representing a higher value.

12. A system according to claim 10 further including an unmanned vending terminal associated with a retailer, and wherein the retailer has the capability of sending a message to the core system to decrement the value of the coded number stored in the mobile phone so as to enable a purchase at the vending terminal.

13. A system according to claim 1, wherein said processor includes means for extracting data representing patterns of usage of coded numbers generated by the database from the data stored in said database.

* * * * *

UNITED STATES PATENT AND TRADEMARK OFFICE
CERTIFICATE OF CORRECTION

PATENT NO. : 7,680,712 B2  Page 1 of 2
APPLICATION NO. : 11/138683
DATED : March 16, 2010
INVENTOR(S) : Scott Thomson et al.

It is certified that error appears in the above-identified patent and that said Letters Patent is hereby corrected as shown below:

In claim 8, column 24, lines 41-46, "claim 2,wherein each coded number of the batch so generated includes a set of digits which form part of the number and which define constraints set on the redemption of the number, the coded numbers all including the same set of digits" should read --claim 1, comprising a plurality of terminals each associated with a member organization for generating message requests and forwarding the message requests to the interface--.

In claim 9, column 24, lines 47-50, "comprising a plurality of terminals each associated with a member organization for generating message requests and forwarding the message requests to the interface" should read --wherein one message format represents a linked transaction in which the message format indicates that a coded number of a particular value is to be replaced by the number generation section with a coded number of a different value, and wherein said interface is adapted to forward such a linked transaction message to the holding area, and said processor is adapted to decrement the fund table in respect of the value of the coded number, to generate a new coded number representing the requested different value, to increment the fund table with the value of the new coded number and to cause the interface to send the new coded number to the terminal from which the request was received--.

In claim 10, column 24, lines 51-63, "claim 1, wherein one message format represents a linked transaction in which the message format indicates that a coded number of a particular value is to be replaced by the number generation section with a coded number of a different value, and wherein said interface is adapted to forward such a linked transaction message to the holding area, and said processor is adapted to decrement the fund table in respect of the value of the coded number, to generate a new coded number representing the requested different value, to increment the fund table with the value of the new coded number and to cause the interface to send the new coded number to the terminal from which the request was received" should read --claim 9 in combination with a plurality of mobile phones, each mobile phone including a SIM card and having a memory storing a coded number issued by the system and a routine whereby users of the mobile phones can text the mobile network operator associated with the mobile phones so that the mobile phone operator can contact the system with a message of the linked message format whereby the coded number stored in the mobile phone can be replaced with another coded number representing a higher value--.

Signed and Sealed this

Fifteenth Day of June, 2010

David J. Kappos
*Director of the United States Patent and Trademark Office*

CERTIFICATE OF CORRECTION (continued)
U.S. Pat. No. 7,680,712 B2

In claim 11, column 24, line 64 to column 25, line 6, "claim 10 in combination with a plurality of mobile phones, each mobile phone including a SIM card and having a memory storing a coded number issued by the system and a routine whereby users of the mobile phones can text the mobile network operator associated with the mobile phones so that the mobile phone operator can contact the system with a message of the linked message format whereby the coded number stored in the mobile phone can be replaced with another coded number representing a higher value" should read --claim 9 further including an unmanned vending terminal associated with a retailer, and wherein the retailer has the capability of sending a message to the core system to decrement the value of the coded number stored in the mobile phone so as to enable a purchase at the vending terminal--.

In claim 12, column 25, line 7 to column 26, line 3, "claim 10 further including an unmanned vending terminal associated with a retailer, and wherein the retailer has the capability of sending a message to the core system to decrement the value of the coded number stored in the mobile phone so as to enable a purchase at the vending terminal" should read --claim 2, wherein each coded number of the batch so generated includes a set of digits which form part of the number and which define constraints set on the redemption of the number, the coded numbers all including the same set of digits--.